(12) United States Patent
Murakami et al.

(10) Patent No.: US 9,892,652 B2
(45) Date of Patent: Feb. 13, 2018

(54) SCORING DEVICE AND SCORING METHOD

(71) Applicant: OMRON Corporation, Kyoto-shi, Kyoto (JP)

(72) Inventors: Tatsuya Murakami, Shiga (JP); Lizhou Zhang, Kyoto (JP)

(73) Assignee: OMRON Corporation, Kyoto (JP)

( * ) Notice: Subject to any disclaimer, the term of this patent is extended or adjusted under 35 U.S.C. 154(b) by 184 days.

(21) Appl. No.: 14/833,941

(22) Filed: Aug. 24, 2015

(65) Prior Publication Data

US 2016/0071428 A1 Mar. 10, 2016

(30) Foreign Application Priority Data

Sep. 5, 2014 (JP) ................................. 2014-181115

(51) Int. Cl.
*G06K 9/00* (2006.01)
*G10H 1/00* (2006.01)
*G09B 15/00* (2006.01)
*A63F 13/814* (2014.01)
*G10H 1/36* (2006.01)
*A63F 13/213* (2014.01)
*A63F 13/46* (2014.01)
*A63F 13/44* (2014.01)

(52) U.S. Cl.
CPC ............ *G09B 15/00* (2013.01); *A63F 13/213* (2014.09); *A63F 13/44* (2014.09); *A63F 13/46* (2014.09); *A63F 13/814* (2014.09); *G06K 9/00255* (2013.01); *G06K 9/00261* (2013.01); *G06K 9/00281* (2013.01); *G06K 9/00315* (2013.01); *G10H 1/361* (2013.01); *G10H 1/368* (2013.01); *G10H 2210/091* (2013.01); *G10H 2220/455* (2013.01); *G10H 2240/085* (2013.01)

(58) Field of Classification Search
CPC ... G06K 9/00268; G06K 9/00302; G10H 1/36
See application file for complete search history.

(56) References Cited

U.S. PATENT DOCUMENTS

2011/0058713 A1* 3/2011 Kogane ............. G06K 9/00308
382/118
2014/0307926 A1* 10/2014 Murakami ................ G06T 7/20
382/107
2014/0361974 A1* 12/2014 Li .......................... G06F 3/005
345/156

(Continued)

FOREIGN PATENT DOCUMENTS

| JP | 2006-126300 A | 5/2006 |
| JP | 2008-170685 A | 7/2008 |
| JP | 2009-288446 A | 12/2009 |

OTHER PUBLICATIONS

Extended European Search Report issued in corresponding European Application No. 15179963.2, dated Jan. 6, 2016 (6 pages).

*Primary Examiner* — Utpal Shah
(74) *Attorney, Agent, or Firm* — Osha Liang LLP

(57) ABSTRACT

A scoring device has an acquisition unit that acquires image data in which a singer is photographed, a detector that detects a feature associated with an expression or a facial motion during singing as a facial feature of the singer from the image data acquired by the acquisition unit, a calculator that calculates a score for singing action of the singer based on the feature detected by the detector, and an output unit that outputs the score.

15 Claims, 19 Drawing Sheets

(56) References Cited

U.S. PATENT DOCUMENTS

| | | | |
|---|---|---|---|
| 2015/0207985 A1* | 7/2015 | Uemura | H04N 5/265 348/333.01 |
| 2015/0227781 A1* | 8/2015 | Morishita | G06K 9/00899 382/118 |
| 2016/0063317 A1* | 3/2016 | Nagai | A63F 13/814 434/250 |
| 2017/0060927 A1* | 3/2017 | Cellier | G06F 17/30345 |

* cited by examiner

FIG. 18

| Feature of scene | Expression |
|---|---|
| A | Cheerful |
| B | Sad |
| C | Earnest |

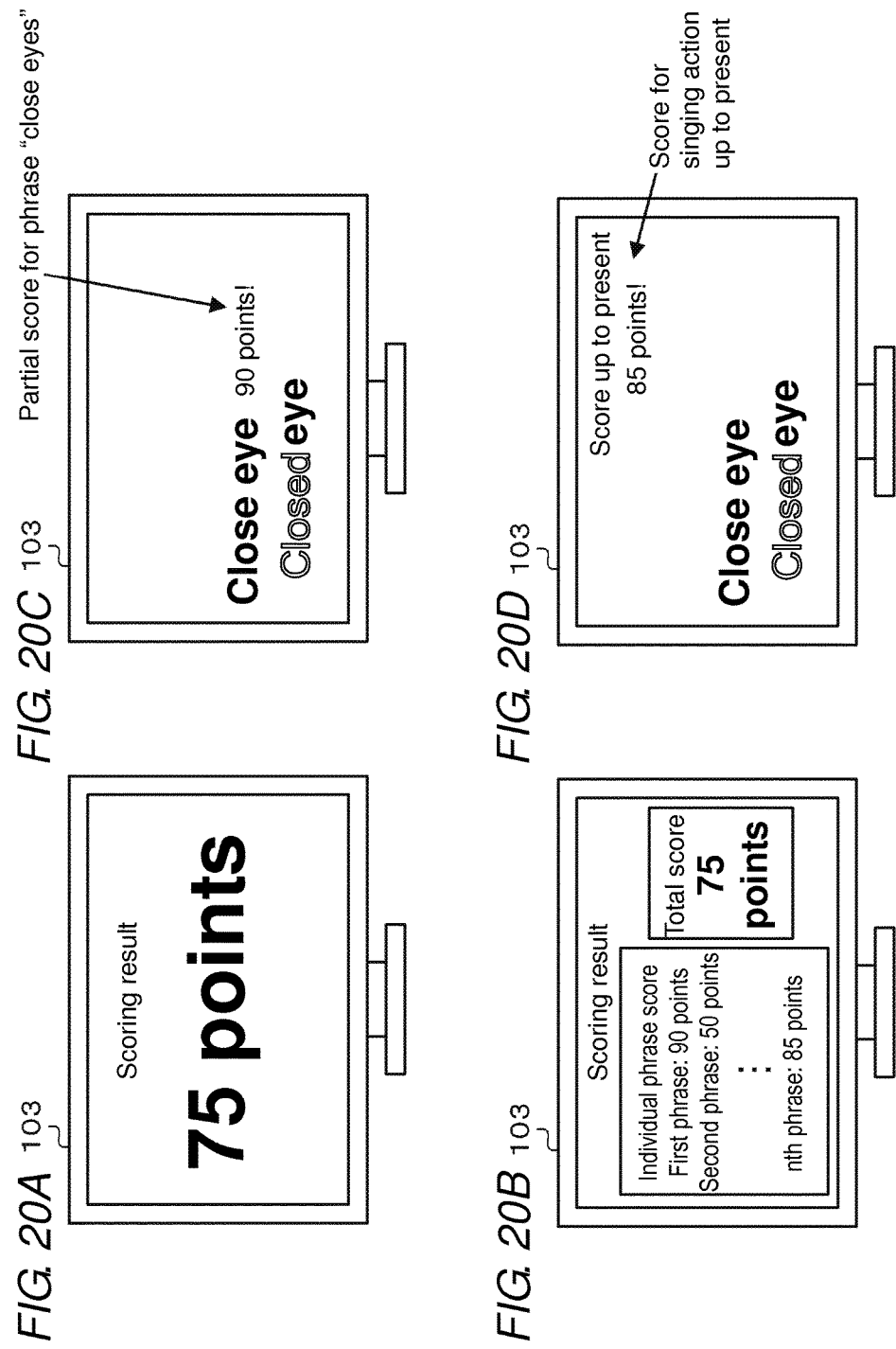

SCORING DEVICE AND SCORING METHOD

CROSS-REFERENCE TO RELATED APPLICATION

This application claims priority to Japanese Patent Application No. 2014-181115 filed with the Japan Patent Office on Sep. 5, 2014, the entire contents of which are incorporated herein by reference.

BACKGROUND

Technical Field

The present invention relates to a scoring device and a scoring method for calculating a score for singer's singing action.

Related Art

In karaoke devices that play back karaoke music, there is a karaoke device that can calculate the score for the singer's singing action. A function of calculating the score for the singing action is called a "scoring function". In the conventional scoring function, the score is calculated based on pieces of information such as a musical interval, swell, and a vocal volume in the singing action. Using the scoring function, the singer can check a result of the singing action as the score, and more enjoy the singing action.

Another function of giving the singer more pleasure during the singing action is also put into use. For example, a function of displaying a national ranking of the score for the singing action through the Internet, a function of playing bingo using the score for the singing action, and a function of outputting a singer's voice from a speaker while the singer's voice is converted are put into use.

Unexamined Japanese Patent Publication No. 2009-288446 discloses a technology of giving the singer more pleasure during the singing action. In the technology disclosed in Unexamined Japanese Patent Publication No. 2009-288446, a feeling of an audience is estimated, and a video image of the karaoke is edited based on an estimated result.

Because the karaoke device is frequently used as an amusement machine, there is a great need for the function of giving the singer more pleasure during the singing action.

SUMMARY

One or more embodiments of the present invention provides a technology that provides a singer more pleasure during the singing action.

According to one or more embodiments of the present invention, a scoring device includes: an acquisition unit configured to acquire image data in which a singer is photographed; a detector configured to detect a feature associated with an expression or a facial motion during singing from the image data acquired by the acquisition unit as a facial feature of the singer; a calculator configured to calculate a score for singing action of the singer based on the feature detected by the detector; and an output unit configured to output the score.

In a scoring device according to one or more embodiments of the present invention, the singer's facial feature (the feature associated with the expression or facial motion during the singing) that is not considered in the past is considered as one of calculation criteria of the score for the singer's singing action. Therefore, the singer can contrive a singing way, and enjoy the singing action. A customer segment of the singer who enjoys the singing action can be expanded. For example, even a person who does not have confidence in singing voice can enjoy the singing action because the person aims at the high score by contriving the expression. Examples of the facial feature include the expression, a degree of motion of the facial organ, the positional relationship between feature points of the facial organ, a visual line direction, a degree of opening of an eye, a gray value near the feature point, periodicity of the gray value near the feature point, directionality of the gray value near the feature point, a color distribution, and a luminance distribution.

According to one or more embodiments of the present invention, the image data is image data of a moving image, the detector detects the facial feature of the singer in each N (N is an integer of 1 or more) frame of the moving image, and the calculator calculates the score based on the feature of each N frame. However, the use of the feature in each N frames can obtain a proper value as the score for the singing action of the whole music sung by the singer. The singer can contrive the singing way of the whole music. As a result, the singer can enjoy more pleasure during the singing action.

According to one or more embodiments of the present invention, a target feature is previously defined with respect to music sung by the singer, and the calculator compares the feature detected by the detector to the target feature, and calculates the score based on a result of the comparison. According to one or more embodiments of the present invention, a target expression is previously defined with respect to the music sung by the singer, the detector detects the expression of the singer in a scoring period that is of at least part of a period of the music, and the calculator calculates the higher score depending on a sum of lengths of periods in which the expression matched with the target expression is detected in the scoring period. According to one or more embodiments of the present invention, the target feature is a feature vector extracted from the image data, the detector extracts the facial feature vector of the singer from the image data acquired by the acquisition unit, and the calculator calculates a similarity between the feature vector extracted by the detector and the target feature vector, and calculates the score based on the calculated similarity. For example, the target feature is the feature intended by a music provider. Therefore, the use of the target feature information can obtain the score more suitable for the intention of the music provider.

According to one or more embodiments of the present invention, a target expression is previously defined as a target feature with respect to the music sung by the singer, the detector calculates a similarity between the previously-defined expression and the expression of the singer with respect to each of a plurality of expressions, and the calculator calculates the score based on the similarity corresponding to the target expression. Therefore, the use of the target feature information can obtain the score more suitable for the intention of the music provider.

According to one or more embodiments of the present invention, a feature change position that is of a time position where the singer should perform the singing while changing the facial feature is previously defined with respect to the music sung by the singer, and the calculator calculates the score based on a degree of change in the feature detected by the detector in the feature change position. Therefore, the use of the target feature information can obtain the score more suitable for the intention of the music provider.

According to one or more embodiments of the present invention, the target facial feature is previously defined in each period of the music sung by the singer. According to one or more embodiments of the present invention, the target facial feature is previously defined in each phrase of the music sung by the singer. Therefore, the singer can contrive a singing way in each period (each phrase), and enjoy the singing action.

According to one or more embodiments of the present invention, in each phrase of the music sung by the singer, the calculator calculates a partial score that is of the score for singing action of the phrase sung by the singer based on the facial feature of the singer when the singer sings the phrase. Therefore, because the singer obtains the score in each phrase, the singer can enjoy the singing action. For example, the singer can understand what level of the singing action of the singer who sings the phrase, and understand the phrase in which the facial feature should be contrived. As a result, the singer can contrive the singing way in each phrase, and enjoy the singing action.

According to one or more embodiments of the present invention, based on the partial score of each phrase, the calculator calculates a whole score that is of the score for the singing action of the whole music sung by the singer. Therefore, not only the score (partial score) in each phrase but also the score (whole score) of the whole music are obtained, which allows the singer to enjoy the singing action. For example, the singer understands what level of the singing action of the singer who sings the whole music, which allows the singer to enjoy the singing action.

Each score obtained in the above manner is output to the outside of the scoring device by the output unit. The output score may be displayed on the display device as a numerical value, the output score may be displayed on the display device while converted into a message that is previously defined in association with the score, or the output score may be used as the motion or expression of a character displayed on the display device, sound output from a speaker, and a change in lighting of a room in which the karaoke device is installed. Thus, each score can be output while being available by the external device, which allows the singer to feed back the score to enjoy the singing action.

One or more embodiments of the present invention includes as a scoring device including at least the units, a scoring method including at least a part of the pieces of processing, a simulation program performing the method, or a recording medium in which the program is recorded. One or more embodiments of the present invention can be made by combining the units and the pieces of processing as much as possible.

One or more embodiments of the present invention provides a singer with more pleasure during the singing action.

BRIEF DESCRIPTION OF THE DRAWINGS

FIG. 18 is a view illustrating an example of information (information indicating a correspondence between a feature of a scene and an expression) used in deciding a correct expression according to the first embodiment;

FIGS. 20A and 20D are views illustrating examples of a score displaying method according to the first to fifth embodiments; and FIGS. 20B and 20C are views illustrating examples of the score displaying method according to the first to fifth embodiments.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

A scoring device and a scoring method according to a first embodiment of the present invention will be described below.

The scoring device of the first embodiment is a device that scores the singer's singing action. For example, the scoring device is used in a karaoke system.

(System Configuration)

Figure 1:
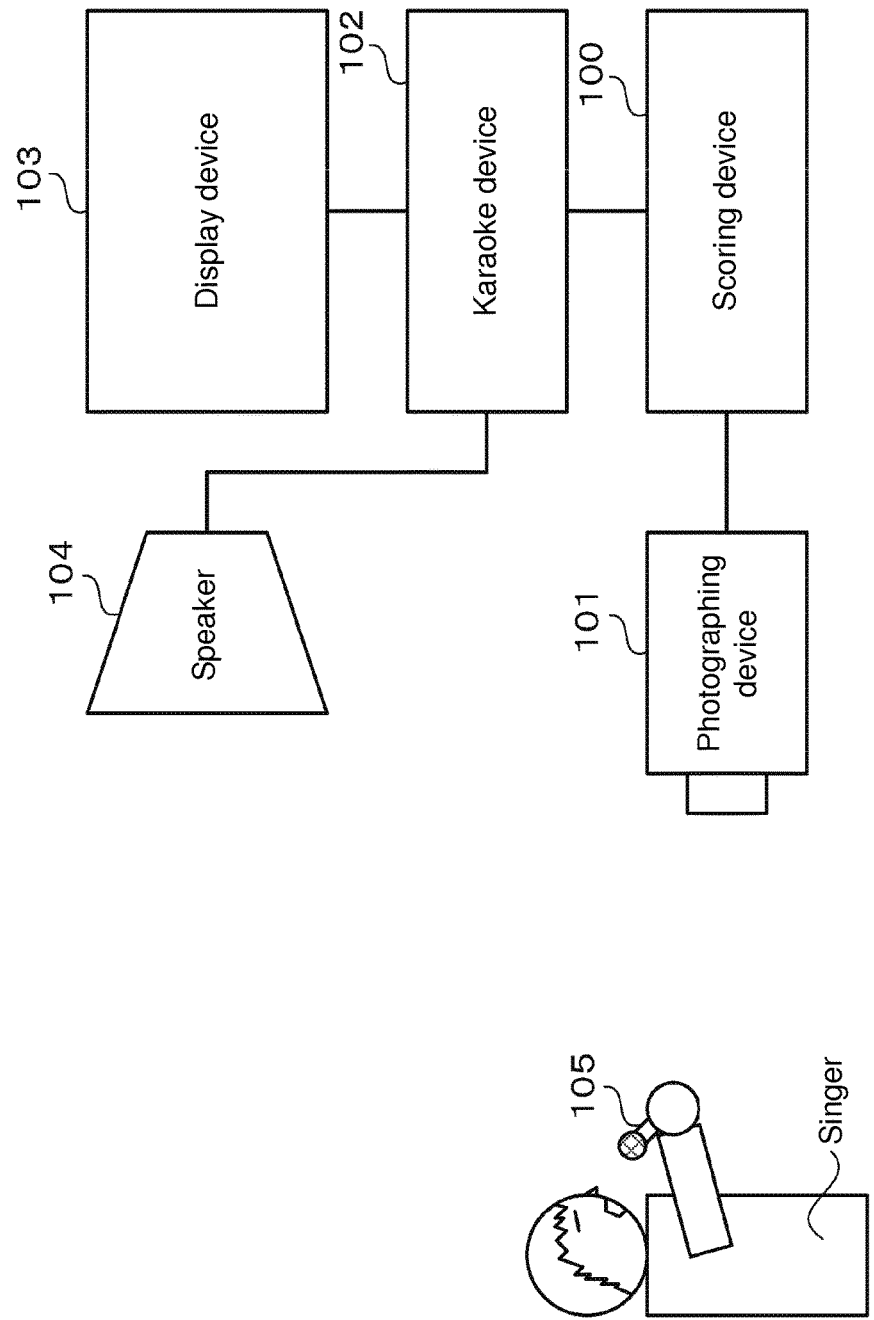
FIG. 1 is a view illustrating an example of a configuration of a karaoke system according to first to fifth embodiments.

FIG. 1 is a view illustrating an example of a configuration of the karaoke system of the first embodiment.

As illustrated in FIG. 1, the karaoke system of the first embodiment includes a scoring device 100, a photographing device 101, a karaoke device 102, a display device 103, a speaker 104, and a microphone 105.

The microphone 105 converts sound into an electric signal, and transmits the electric signal to the karaoke device 102. For example, a singing voice of the singer is converted into the electric signal, and transmits the electric signal to the karaoke device 102.

The karaoke device 102 generates the electric signal expressing the music. For example, the karaoke device 102 generates the electric signal expressing the music selected by the signer.

The karaoke device 102 receives the electric signal expressing the sound from the microphone 105. For example, the karaoke device 102 receives the electric signal expressing the singing voice of the singer from the microphone 105.

The karaoke device 102 transmits the electric signal expressing the sound to the speaker 104. For example, the karaoke device 102 generates the electric signal expressing one of or both the music and the singing voice of the singer, and transmits the generated electric signal to the speaker 104.

The karaoke device 102 acquires a scoring result (score data expressing the score for the singing voice of the singer) from the scoring device 100.

The karaoke device 102 outputs image data to display device 103. For example, the karaoke device 102 outputs image data (image data expressing an image (video image) of the karaoke; karaoke image data) corresponding to the music and image data (score image data) expressing the scoring result to the display device 103.

The speaker 104 generates sound according to the electric signal. For example, the speaker 104 outputs one of or both the music and the singing voice of the singer.

The display device 103 displays the image on a screen based on the image data output from the karaoke device 102. For example, the display device 103 displays the image (karaoke image) on the screen based on the karaoke image data, and displays the image (score image) on the screen based on the score image data.

The photographing device 101 generates image data (photographed image data) by photographing the singer, and outputs the photographed image data to the scoring device 100.

The scoring device 100 acquires the photographed image data in which the singer is photographed from the photographing device 101, and calculates the score for the singer's singing action based on the acquired photographed image data. The scoring device 100 outputs the score data expressing the calculated score to the karaoke device 102.

The scoring device 100 may be provided in the karaoke device 102.

In the first embodiment, by way of example, the score is calculated based only on the photographed image data. Alternatively, the score may be calculated based on the pieces of information such as the musical interval, the swell, and the vocal volume in the singing action in addition to the photographed image data.

(Configuration of Scoring Device)

Figure 2:
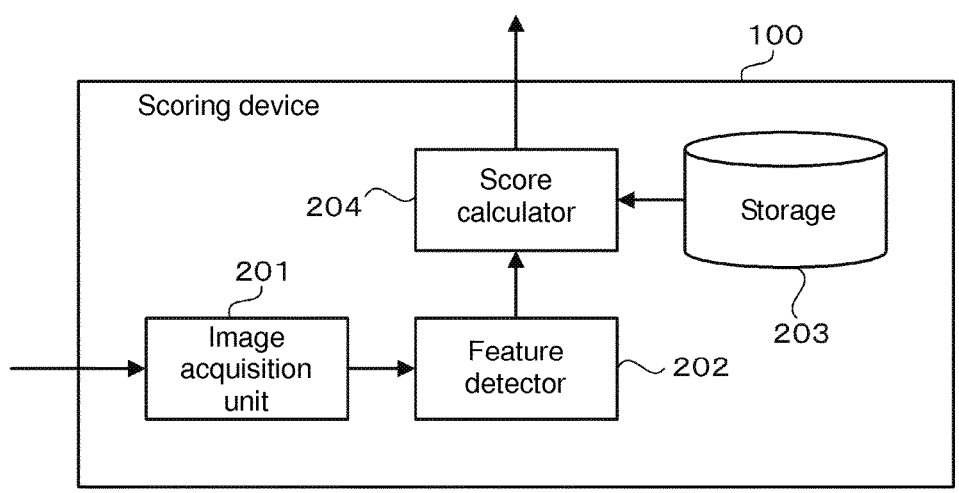
FIG. 2 is a block diagram illustrating an example of a functional configuration of a scoring device according to the first to fifth embodiments.

FIG. 2 is a block diagram illustrating an example of a functional configuration of the scoring device 100.

The scoring device 100 includes an image acquisition unit 201, a feature detector 202, a storage 203, and a score calculator 204.

The image acquisition unit 201 acquires the photographed image data from the photographing device 101, and outputs the acquired photographed image data to the feature detector 202. In the first embodiment, the image data of the moving image is acquired as the photographed image data.

The feature detector 202 detects the feature associated with the expression or facial motion during the singing as the singer's facial feature from the photographed image data output by the image acquisition unit 201. For example, the "expression" means a feeling or an emotion expressed by a person's aspect. For example, the "facial motion" means motion of a facial organ and a change of a positional relationship between plural facial organs. The feature detector 202 outputs a detection result of the feature to the score calculator 204. In the first embodiment, the singer's facial feature is detected in each N frame (N is an integer of 1 or more) of the moving image expressed by the photographed image data. In the first embodiment, the singer's expression is detected as the singer's facial feature. Hereinafter, the expression detected by the feature detector 202 is referred to as a "detected expression".

Target feature information expressing the target facial feature is recorded in the storage 203 while correlated with the music sung by the singer. Thus, in the first embodiment, the target feature is previously defined with respect to the music sung by the singer. Specifically, one feature (one kind) of the music is previously defined as the target feature. More specifically, one expression is previously defined as the target expression (correct expression) with respect to the music. For example, a magnetic disk, an optical disk, and a nonvolatile memory can be used as the storage 203.

The score calculator 204 calculates the score for the singer's singing action based on the feature (feature in each N frames) detected by the feature detector 202. In the first embodiment, the detected feature (feature in each N frames) is compared to the target feature, and the score is calculated based on the comparison result. Specifically, the detected expression in each N frames is compared to the correct expression, and the score is calculated based on the comparison result.

Thus, in the first embodiment, the singer's facial feature that is not considered in the past is considered as one of calculation criteria of the score for the singer's singing action. Therefore, the singer can contrive a singing way, and enjoy the singing action. A customer segment of the singer who enjoys the singing action can be expanded. For example, even a person who does not have confidence in singing voice can enjoy the singing action because the person aims at the high score by contriving the expression.

In the first embodiment, by way of example, the score is calculated using the target feature information. Alternatively, the score may be calculated in any way as long as the feature detected by the feature detector 202 is used. For example, the score may be calculated using information (function or table) expressing a correspondence between the feature and the score. However, for example, the target feature information expresses the feature that is intended by a music provider. Therefore, the use of the target feature information can obtain the score more suitable for the intention of the music provider.

In the first embodiment, by way of example, the photographed image data is the image data of the moving image, and the feature is detected and used in each N frames of the moving image. Alternatively, for example, the photographed image data may be the image data of a still image. The feature may be detected from one image data (the image data of the still image or the one-frame image data of the moving image). However, the use of the feature in each N frames can obtain a proper value as the score for the singing action of the whole music sung by the singer. The singer can contrive the singing way of the whole music. As a result, the singer can enjoy more pleasure during the singing action.

In the first embodiment, by way of example, the expression is used as the facial feature. Alternatively, for example, a degree of motion of the facial organ, the positional relationship between feature points of the facial organ, a visual line direction, a degree of opening of an eye, a gray value near the feature point, periodicity of the gray value near the feature point, directionality of the gray value near the feature point, a color distribution, and a luminance distribution may be used as the facial feature.

(Feature Detecting Method)

Figure 13:
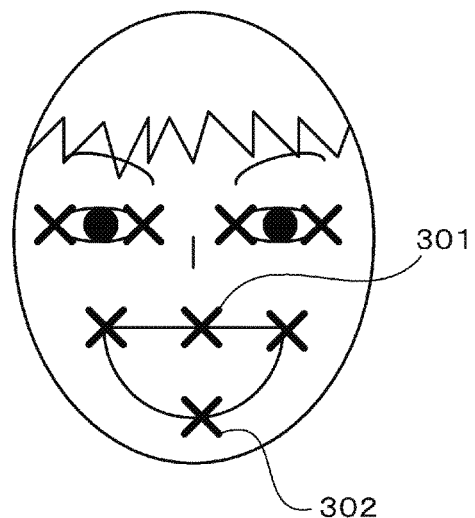
FIG. 13 is a view illustrating an example of an expression detecting method according to the first embodiment.

An example of a feature detecting method of the first embodiment will be described with reference to FIG. 13.

An example in which the expression is detected as the facial feature will be described below.

The feature detector 202 detects a feature point of the singer's face from an image region expressed by the photographed image data. In FIG. 13, a mark "x" indicates the feature point. Specifically, the feature detector 202 detects a singer's facial region (facial region) from the image region expressed by the photographed image data, and detects the feature point from the facial region. Any existing technology may be adapted to processing of detecting the facial region (face detecting processing). Examples of the face detecting processing include pattern matching in which texture information is used, a method for detecting the facial region by model fitting based on a contour or the facial organ (such as an eye, a nose, and a mouth), and a method for detecting the facial region based on a skin color or a gray-scale distribution.

The feature detector 202 detects the singer's expression based on an arrangement pattern of the detected feature points. In the first embodiment, pattern information expressing the arrangement pattern of the feature points is previously defined in each expression. The feature detector 202 detects the expression corresponding to the arrangement pattern of the detected feature points as the singer's expression from the plural expressions expressed by the pattern information. Examples of the expression include "pleasant expression", "sad expression", and "earnest expression".

Sometimes a face of a person other than the singer is photographed in the image expressed by the photographed image data. In such cases, for example, a microphone region is detected, and a region of the face closest to the microphone region may be detected as the singer's facial region. The microphone region can be detected by performing processing similar to the face detecting processing.

Desirably a feature point specialized in the detection of the expression is detected. For example, desirably the feature point of the organ (such as eyes, an eyebrow, a cheek, a forehead, and a mouth) in which an expression is easy to change is detected. In the example of FIG. 13, five points of an inner corner of an eye, a tail of an eye, a mouth, a center of an upper lip, and a center of a lower lip are detected as the feature points.

The expression detecting method is not limited to the above method. For example, the expression may be detected using the degree of motion of the facial organ, the visual line direction, the degree of opening of the eye, the gray value near the feature point, the periodicity of the gray value near the feature point, the directionality of the gray value near the feature point, the color distribution, and the luminance distribution.

(Target Feature Information Generating Method)

An example of a target feature information generating method of the first embodiment will be described with reference to FIGS. 14 to 18.

An example in which a correct expression is decided will be described below.

The methods are described below only by way of example, but the target feature information generating method of the first embodiment is not limited to the following methods.

The first method will be described with reference to FIGS. 14 and 15.

Figure 14:
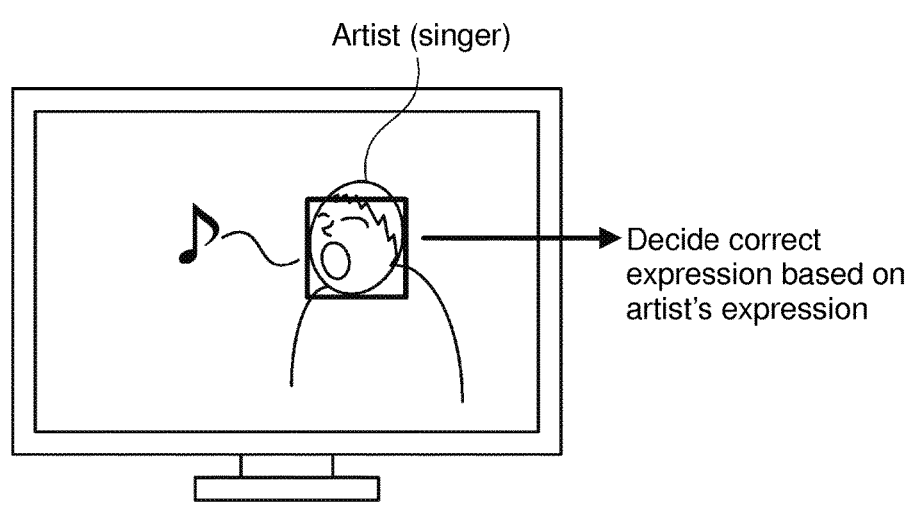
FIG. 14 is a view illustrating an example of a correct expression deciding method according to the first embodiment.

In the first method, as illustrated in FIG. 14, the correct expression is decided based on the expression of an artist who sings the music. The image data (artist image data) expressing the artist who sings the music is used in the first method. For example, the artist image data is image data of a music program or a promotion video (PV).

Figure 15:
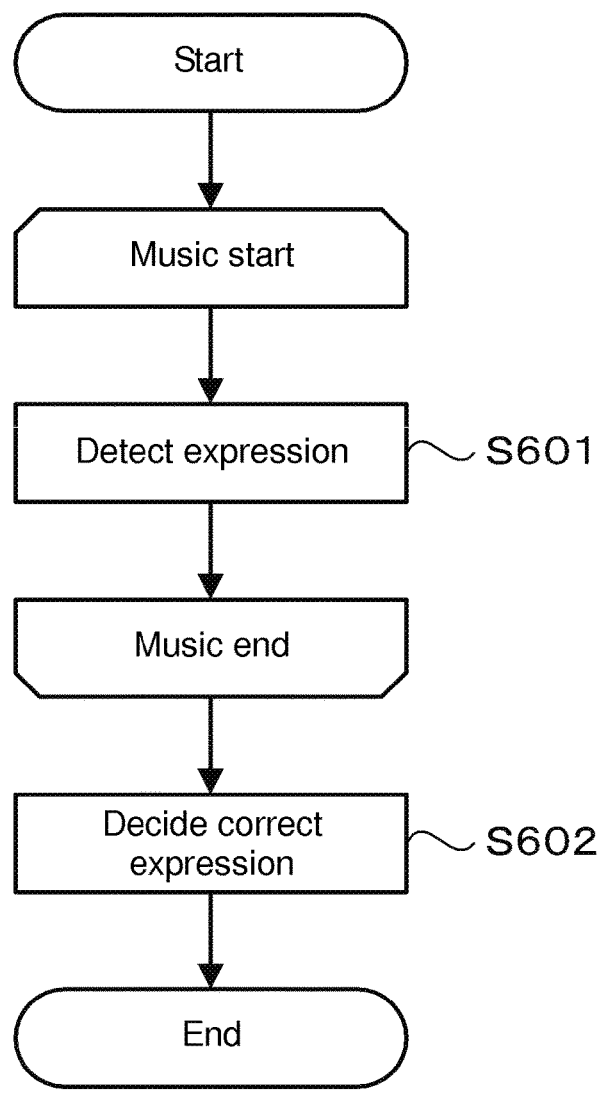
FIG. 15 is a flowchart illustrating an example of the correct expression deciding method according to the first embodiment.

As illustrated in FIG. 15, processing in S601 is repeated from music start to music end. For example, the processing in S601 is performed in each M frames (M is an integer of 1 or more). M may be equal to or different from N.

In S601, the artist's expression is detected from the artist image data.

The correct expression is detected based on the detected plural expressions (artist's expressions) (S602). For example, the expression having the highest detection frequency is detected as the correct expression.

A representative value except for a mode of the detected plural features (artist's facial features) may be decided as the target feature. Examples of the representative value except for the mode include a maximum value, a minimum value, a mean, and an intermediate value.

Although a detail is described in another embodiment, the target feature may be defined in each period (such as the phrase) of the music. In this case, in each period of the music, the target feature of the period may be decided based on the detected plural features.

The second method will be described with reference to FIGS. 16 to 18.

Figure 16:
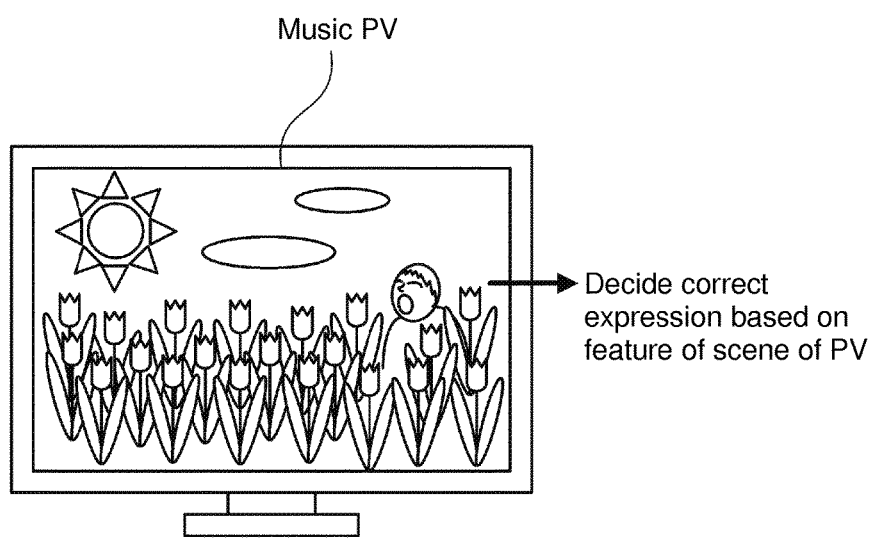
FIG. 16 is a view illustrating an example of the correct expression deciding method according to the first embodiment.

In the second method, as illustrated in FIG. 16, the correct expression is decided based on the feature of a scene of a music PV. The image data (PV image data) of the music PV is used in the second method.

Figure 17:
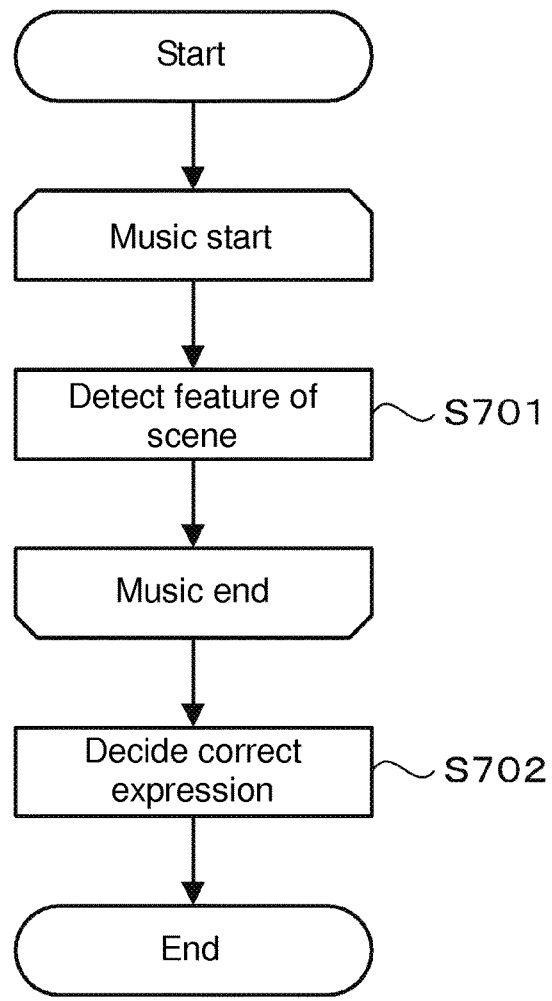
FIG. 17 is a flowchart illustrating an example of the correct expression deciding method according to the first embodiment.

As illustrated in FIG. 17, processing in S701 is repeated from music start to music end. For example, the processing in S701 is performed in each M frames (M is an integer of 1 or more).

In S701, the feature of the scene is detected from the PV image data. Examples of the feature of the scene include the number of colors, luminance, the number of edges, a color distribution, and a luminance distribution.

The correct expression is detected based on the detected feature (the feature of the scene of the PV) (S702). For example, information (table) expressing a correspondence between the feature of the scene and the expression is previously prepared as illustrated in FIG. 18. The information in FIG. 18 can be decided by prior learning. In S702, in each M frames, the expression corresponding to the feature of the frame is acquired from the information in FIG. 18. The expression having the highest acquisition frequency is detected as the correct expression.

The representative value except for the mode of the facial features of the M frames may be decided as the target feature.

In each period of the music, the target feature of the period may be decided based on the acquired plural features (the features of the scene or the facial features) for the period.

(Operation of Scoring Device)

Figure 3:
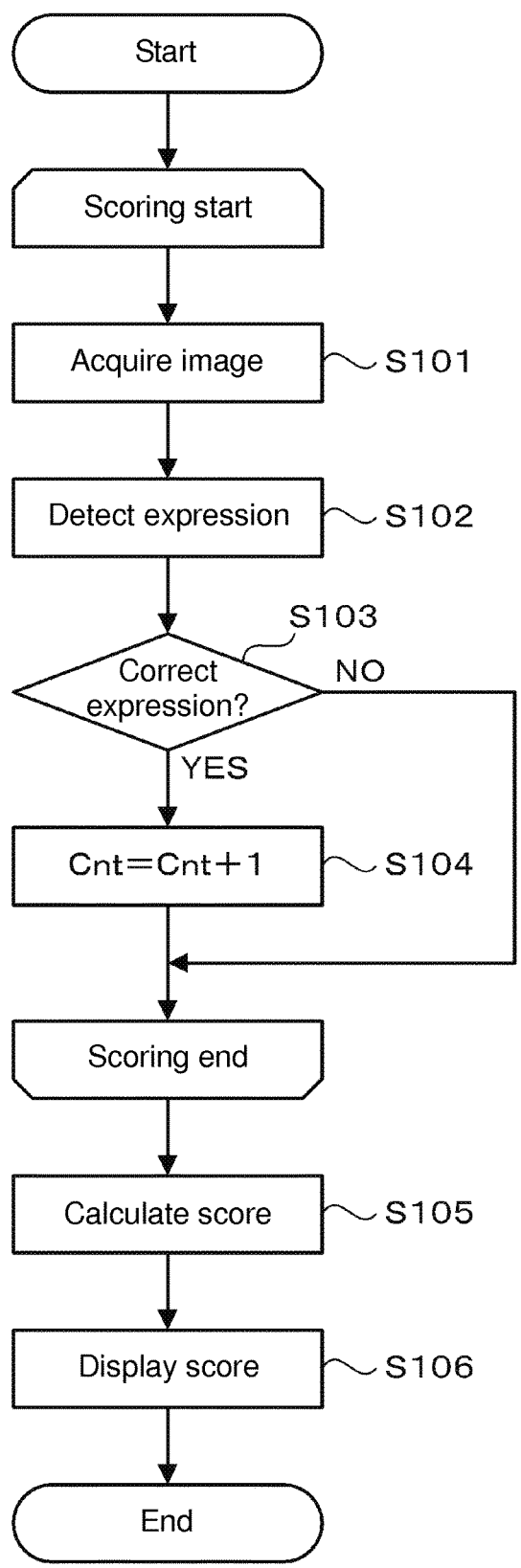
FIG. 3 is a flowchart illustrating an example of a flow of operation of the scoring device according to the first embodiment.

An example of a flow of operation of the scoring device 100 of the first embodiment will be described with reference to FIG. 3. A flowchart in FIG. 3 is started with the start of the music sung by the singer as a trigger. Specifically, the flowchart in FIG. 3 is started with playback of the music to be sung by the singer as the trigger.

As illustrated in FIG. 3, pieces of processing in S101 to S104 are performed in each N frames (each predetermined time) in a period (scoring period) from scoring start to scoring end. The scoring period is at least part of the period of the music. The period from the music start to the music end may be used as the scoring period.

In S101, the image acquisition unit 201 acquires the photographed image data. Then the processing goes to S102.

In S102, the feature detector 202 detects the singer's expression from the photographed image data acquired in S101. Then the processing goes to S103.

In S103, the score calculator 204 determines whether the expression (detected expression) detected in S102 is matched with the correct expression recorded in the storage 203. The processing goes to S104 when the detected expression is matched with the correct expression. The processing in S104 is not performed when the detected expression is not matched with the correct expression. Only the detected expression that is completely matched with the correct expression may be determined or not determined as "the detected expression matched with the correct expression". The detected expression completely matched with the correct expression and the detected expression similar to the correct expression may be determined as "the detected expression matched with the correct expression".

In S104, the score calculator 204 increments a count value Cnt by 1. The count value Cnt expresses the number of times the detected expression matched with the correct expression is detected. The count value Cnt is initialized to 0 in starting the flowchart in FIG. 3.

The processing goes to S105 after a scoring period is ended.

In S105, the score calculator 204 calculates the score based on the count value Cnt. In the first embodiment, the higher score is calculated with increasing sum of lengths of the periods detecting the detected expression matched with the correct expression in the scoring period. Specifically, the higher score is calculated with increasing count value Cnt. For example, a ratio of the count value to the total number of detection times of the detected expression is calculated as the score. The score calculator 205 outputs the score data expressing the calculated score to the karaoke device 102.

The karaoke device 102 outputs the score image data expressing the score calculated in S105 to the display device 103 (S106). Therefore, the score image expressing the score calculated in S105 is displayed on the screen of the display device 103. FIG. 20A illustrates an example of the score image.

The processing in S106 may be performed by the scoring device 100. That is, the scoring device 100 may include a function of displaying the score on the screen of the display device 103.

(Specific example of Operation of Scoring Device)

A specific example of the operation of the scoring device 100 of the first embodiment will be described with reference to FIG. 4.

Figure 4:
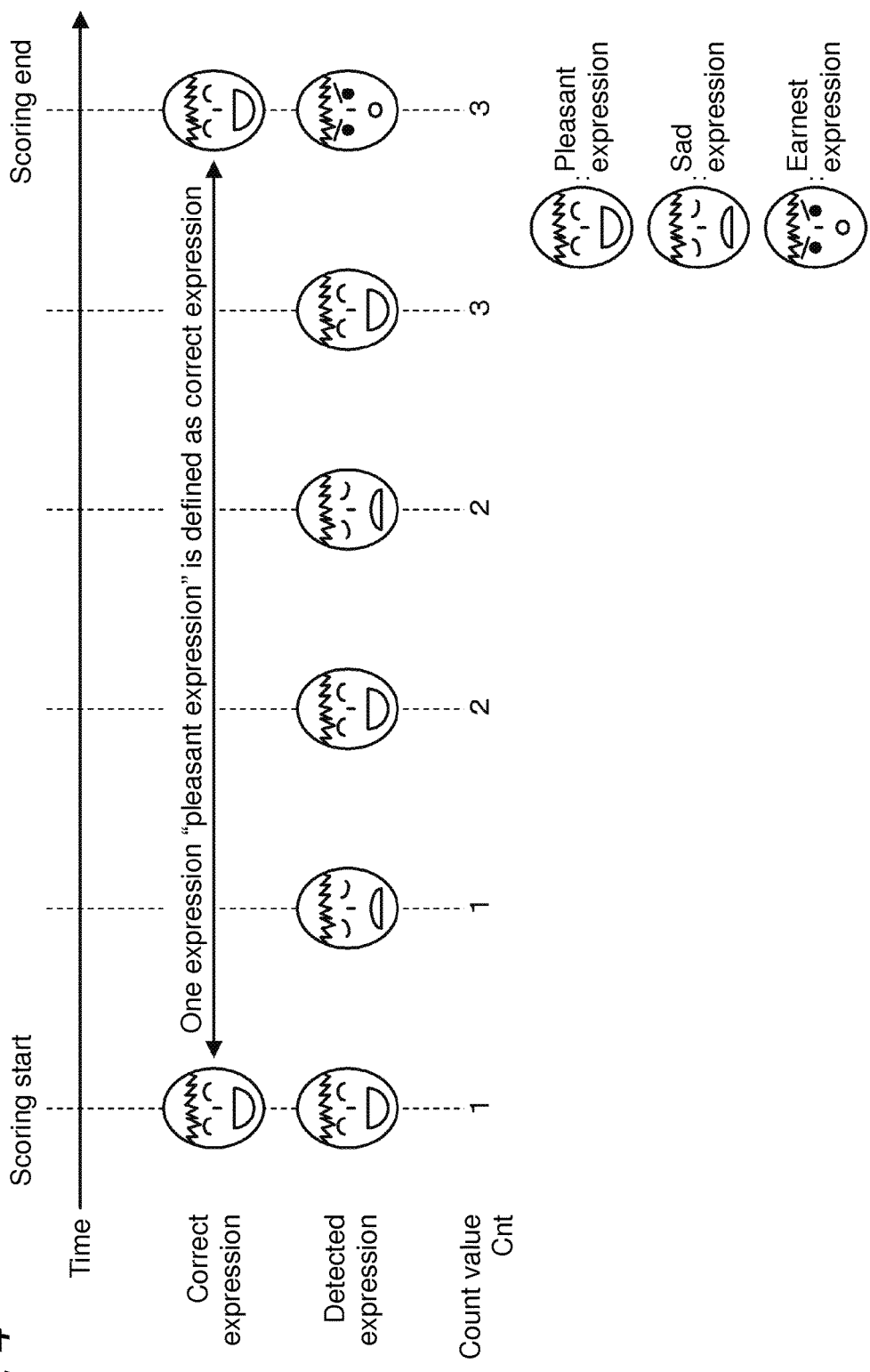
FIG. 4 is a view illustrating a specific example of the operation of the scoring device according to the first embodiment.

In the example in FIG. 4, one correct expression "pleasant expression" is previously defined with respect to the music. In the example of FIG. 4, the singer's expression is detected six times in total.

In a first time, the "pleasant expression" is detected as the singer's expression in S102 of FIG. 3. The count value Cnt is incremented by 1 in S104 because the detected expression is matched with the correct expression. As a result, the count value Cnt is updated from 0 to 1.

In a second time, the "sad expression" is detected as the singer's expression in S102 of FIG. 3. Because the detected expression is not matched with the correct expression, the processing in S104 is not performed, but the count value Cnt is maintained at 1.

In a third time, the "pleasant expression" is detected as the singer's expression in S102 of FIG. 3. The count value Cnt is incremented by 1 in S104 because the detected expression is matched with the correct expression. As a result, the count value Cnt is updated from 1 to 2.

In a fourth time, the "sad expression" is detected as the singer's expression in S102 of FIG. 3. Because the detected expression is not matched with the correct expression, the processing in S104 is not performed, but the count value Cnt is maintained at 2.

In a fifth time, the "pleasant expression" is detected as the singer's expression in S102 of FIG. 3. The count value Cnt is incremented by 1 in S104 because the detected expression is matched with the correct expression. As a result, the count value Cnt is updated from 2 to 3.

In a sixth time, the "earnest expression" is detected as the singer's expression in S102 of FIG. 3. Because the detected expression is not matched with the correct expression, the processing in S104 is not performed, but the count value Cnt is maintained at 3.

In the example of FIG. 4, the count value Cnt of 3 is obtained as the final value. The detected expression is detected six times in total. Therefore, 50 points (=50%=100×3÷6) are obtained as the score.

An expression except for the "pleasant expression", the "sad expression", and the "earnest expression" may be detected as the detected expression. An expression except for the "pleasant expression", the "sad expression", and the "earnest expression" may be used as the correct expression.

As described above, in the first embodiment, the singer's facial feature that is not considered in the past is considered as one of calculation criteria of the score for the singer's singing action. Specifically, the singer's expression is detected in the scoring period, and the higher score is calculated with increasing sum of lengths of the periods detecting the expression matched with the correct expression in the scoring period. Therefore, the singer can contrive a singing way, and enjoy the singing action. A customer segment of the singer who enjoys the singing action can be expanded.

Second Embodiment

A scoring device and a scoring method according to a second embodiment of the present invention will be described below.

Configurations of the karaoke system of the second embodiment and the scoring device of the second embodiment are similar to those of the first embodiment (FIGS. 1 and 2), and thus the descriptions of the karaoke system and scoring device of the second embodiment are omitted.

In the second embodiment, in each phrase of the music sung by the singer, the score calculator 204 calculates a partial score that is of the score for the singing action of the phase sung by the singer based on the singer's facial feature when the singer sings the phase. Therefore, because the singer obtains the score in each phrase, the singer can enjoy the singing action. For example, the singer can understand what level of the singing action of the singer who sings the phrase, and understand the phrase in which the facial feature should be contrived. As a result, the singer can contrive the singing way in each phrase, and enjoy the singing action.

In the second embodiment, based on the partial score of each phrase, the score calculator 204 calculates a whole score that is of the score for the singing action of the whole music sung by the singer. Therefore, not only the score (partial score) in each phrase but also the score (whole score) of the whole music are obtained, which allows the singer to enjoy the singing action. For example, the singer understands what level of the singing action of the singer who sings the whole music, which allows the singer to enjoy the singing action.

In the second embodiment, the target facial feature is previously defined in each period of the music sung by the singer. Specifically, the target facial feature is previously defined in each phrase of the music sung by the singer. Therefore, the singer can contrive a singing way in each period (each phrase), and enjoy the singing action.

One period during which the target feature is prepared is not limited to the period of one phrase. There is no particular limitation to the length of the period during which the target feature is prepared. The period during which the target feature is prepared may be longer or shorter than the period of one phrase.

Figure 19A:
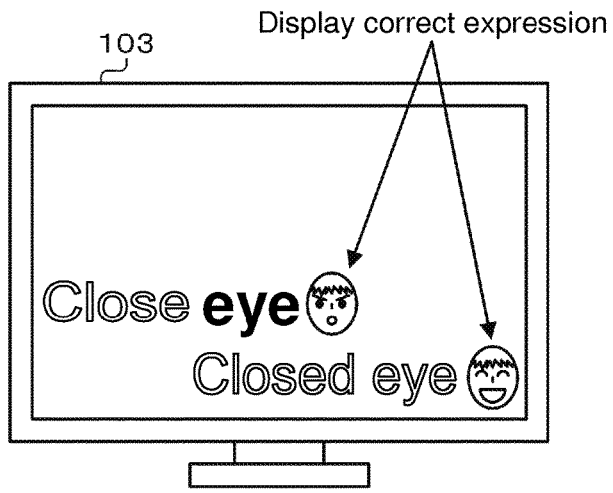
FIG. 19A is a view illustrating an example of a karaoke image according to the second embodiment.

Although the description is omitted in the first embodiment, desirably the image further expressing the correct expression is displayed as the karaoke image. For the second embodiment, in each phase, desirably the correct expression of the phrase is displayed while correlated with the phase (FIG. 19A). Therefore, the singer can understand the correct expression during the singing, which promotes the singer to make the expression closer to the correct expression. As a result, the effect of causing the singer to contrive the singing way and the effect of causing the singer to enjoy the singing action can be more securely obtained.

Figure 19B:
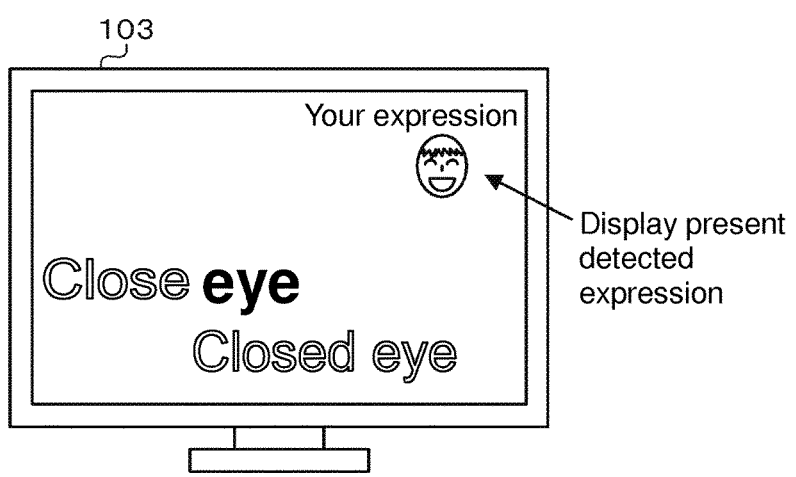
FIGS. 19B and 19C are views illustrating examples of the karaoke image according to the first to fifth embodiments.

Desirably the image further expressing the present detected expression is displayed as the karaoke image (FIG. 19B). Therefore, the singer can understand the own expression during the singing. As a result, singer's contrivance to make the expression or singer's motivation for the singing action can be enhanced.

Figure 19C:
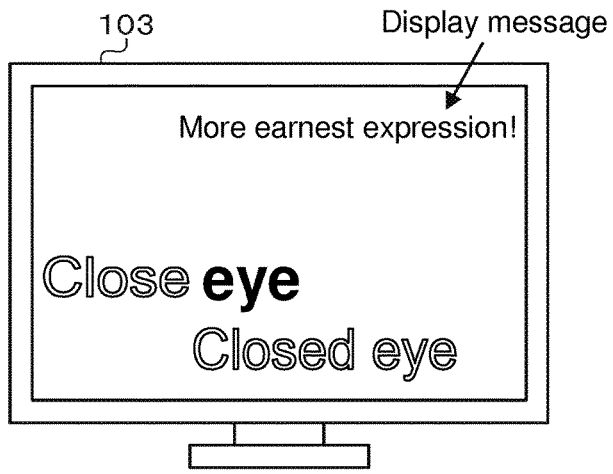

Desirably the image on which a graphic image (an icon or a message) expressing the result of the comparison between the correct expression and the detected information is superposed is displayed as the karaoke image. Desirably the image on which the message such as "more earnest expression!" and "good expression!" is superposed is displayed (FIG. 19C). Therefore, the singer's contrivance to make the expression or the singer's motivation for the singing action can be enhanced.

(Operation of Scoring Device)

Figure 5:
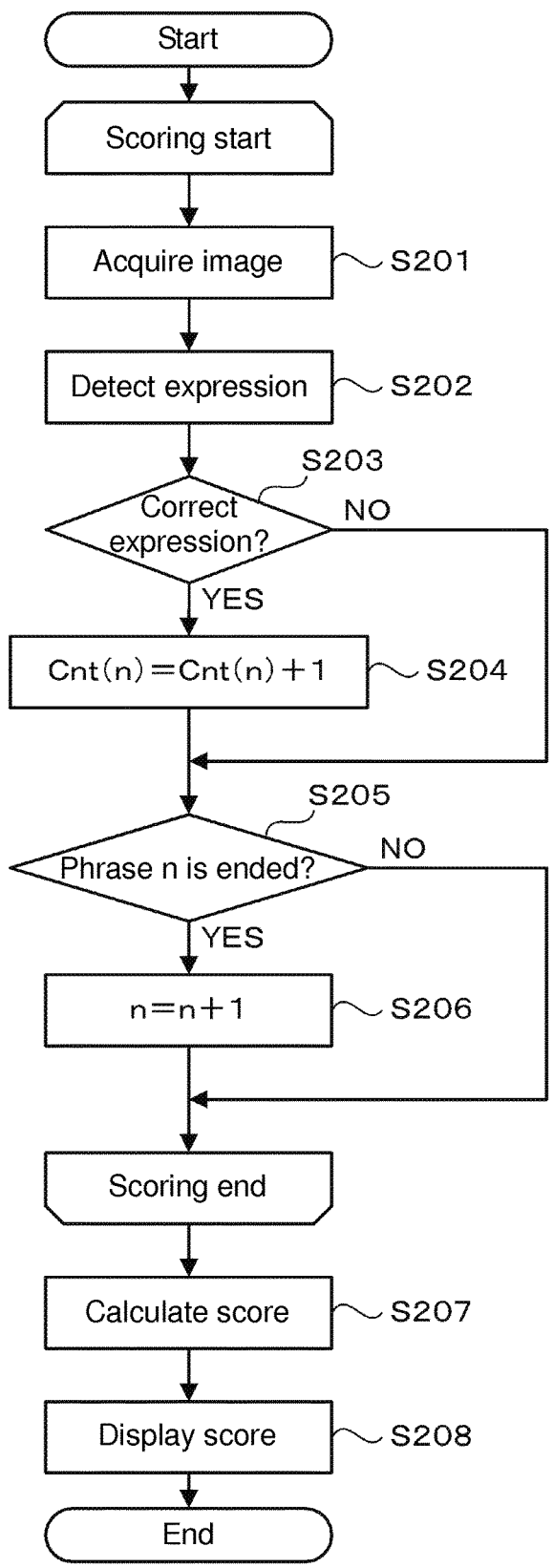
FIG. 5 is a flowchart illustrating an example of the flow of the operation of the scoring device according to the second embodiment.

An example of the flow of the operation of the scoring device 100 of one or more embodiments of the present invention will be described with reference to FIG. 5. A flowchart in FIG. 5 is started with the start of the music sung by the singer as the trigger. Specifically, the flowchart in FIG. 5 is started with the playback of the music to be sung by the singer as the trigger.

The case that the facial feature is the expression is described below by way of example. However, the facial feature is not limited to the expression.

As illustrated in FIG. 5, pieces of processing in S201 to S206 are performed in each N frames (each predetermined time) in the period (scoring period) from the scoring start to the scoring end.

In S201, the image acquisition unit 201 acquires the photographed image data. Then the processing goes to S202.

In S202, the feature detector 202 detects the singer's expression from the photographed image data acquired in S201. Then the processing goes to S203.

In S203, the score calculator 204 determines whether the expression (detected expression) detected in S202 is matched with the correct expression recorded in the storage 203. Specifically, whether the detected expression is matched with the correct expression of the present singing target phrase (nth (n is an integer of 1 or more) phrase) is determined. The processing goes to S204 when the detected expression is matched with the correct expression. The processing goes to S205 when the detected expression is not matched with the correct expression.

In S204, the score calculator 204 increments the count value Cnt(n) of the nth phrase by 1. Then the processing goes to S205. The count value Cnt(n) expresses the number of times the detected expression matched with the correct expression is detected in the period of the nth phrase. The count value Cnt(n) of each phrase is initialized to 0 in starting the flowchart in FIG. 5.

In S205, the score calculator 204 determines whether a period of the nth phrase (phrase n) is ended. The processing goes to S206 when the period of the nth phrase is ended. The processing in S206 is not performed when the period of the nth phrase is not ended.

In S206, the score calculator 204 increments the phrase number n by 1. The phrase number n is a phrase number. The phrase number n is initialized to 1 in starting the flowchart in FIG. 5.

The processing goes to S207 after the scoring period is ended.

In S207, the score calculator 204 calculates the partial score and the whole score based on the count value Cnt(n). In the second embodiment, in each phrase, the higher score is calculated with increasing count value Cnt (n). Specifically, in each phrase, a ratio of the count value Cnt(n) of the phase to the total number of times the detected expression is detected in the period of the phrase is calculated as the partial score of the phrase. The mean of the partial scores of the phrases is calculated as the whole score. The score calculator 205 outputs the score data expressing the calculated score to the karaoke device 102.

Similarly to the score calculating method of the first embodiment, the partial score calculating method is not limited to the above method.

Also the whole score calculating method is not limited to the above method. For example, the whole score may be calculated by the method similar to that of the first embodiment. The whole score may be calculated by performing weighting composition of the partial score of each phrase. In the weighting composition, desirably a weight larger than weights of other partial scores is set as a weight of the partial score of the most sensational phrase (for example, a hook) in the music.

The karaoke device 102 outputs the score image data expressing the score calculated in S207 to the display device 103 (S208). Therefore, the score image expressing the score calculated in S207 is displayed on the screen of the display device 103. FIG. 20B illustrates an example of the score image. The score image in FIG. 20B illustrates both the partial score (individual phrase score) and the whole score (total score).

Similarly to the processing in S106 in FIG. 3, the processing in S208 may be performed by the scoring device 100.

Both the partial score and the whole score may be displayed on the screen of the display device 103 as the scoring result, or one of the partial score and the whole score may be displayed on the screen of the display device 103 as the scoring result.

As illustrated in FIG. 20C, the partial score may be displayed in real time during the singing of the singer. As illustrated in FIG. 20D, the score for the singing action in the period from the scoring start to the present may be calculated and displayed in real time during the singing of the singer. Therefore, the singer's contrivance to make the expression or the singer's motivation for the singing action can be enhanced.

(Specific Example of Operation of Scoring Device)

A specific example of the operation of the scoring device 100 of the second embodiment will be described with reference to FIG. 6.

Figure 6:
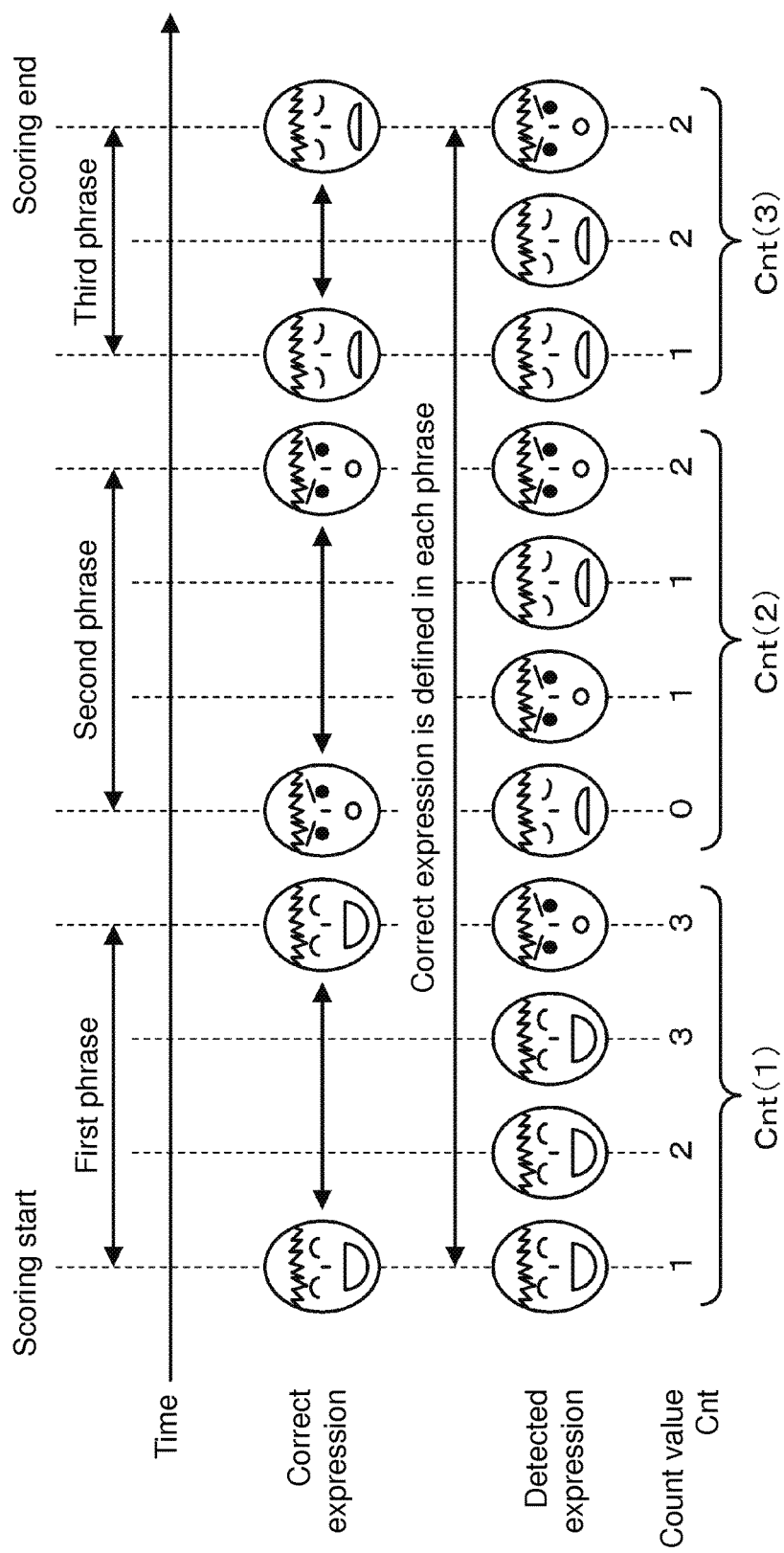
FIG. 6 is a view illustrating a specific example of the operation of the scoring device of the second embodiment.

In the example of FIG. 6, the music includes three phrases, namely, a first phrase to a third phrase. The "pleasant expression" is previously defined as the correct expression of the first phrase, the "earnest expression" is previously defined as the correct expression of the second phrase, and the "sad expression" is previously defined as the correct expression of the third phrase. In the example of FIG. 6, the singer's expression is detected four times in total during the period of the first phrase, the singer's expression is detected four times in total during the period of the second phrase, and the singer's expression is detected three times in total during the period of the third phrase.

The processing associated with the period of the first phrase will be described below.

In the first time, the "pleasant expression" is detected as the singer's expression in S202 of FIG. 5. The count value Cnt(1) is incremented by 1 in S204 because the detected expression is matched with the correct expression. As a result, the count value Cnt(1) is updated from 0 to 1.

In the second time, the "pleasant expression" is also detected as the singer's expression in S202 of FIG. 5. The count value Cnt(1) is incremented by 1 in S204 because the detected expression is matched with the correct expression. As a result, the count value Cnt(1) is updated from 1 to 2.

In the third time, the "pleasant expression" is also detected as the singer's expression in S202 of FIG. 5. The count value Cnt(1) is incremented by 1 in S204 because the detected expression is matched with the correct expression. As a result, the count value Cnt(1) is updated from 2 to 3.

In the fourth time, the "earnest expression" is detected as the singer's expression in S202 of FIG. 5. Because the detected expression is not matched with the correct expression, the processing in S204 is not performed, but the count value Cnt(1) is maintained at 3.

The processing associated with the period of the second phrase will be described below.

In the first time, the "sad expression" is detected as the singer's expression in S202 of FIG. 5. Because the detected expression is not matched with the correct expression, the processing in S204 is not performed, but the count value Cnt(2) is maintained at 0.

In the second time, the "earnest expression" is detected as the singer's expression in S202 of FIG. 5. The count value Cnt(2) is incremented by 1 in S204 because the detected expression is matched with the correct expression. As a result, the count value Cnt(2) is updated from 0 to 1.

In the third time, the "sad expression" is detected as the singer's expression in S202 of FIG. 5. Because the detected expression is not matched with the correct expression, the processing in S204 is not performed, but the count value Cnt(2) is maintained at 1.

In the fourth time, the "earnest expression" is detected as the singer's expression in S202 of FIG. 5. The count value Cnt(2) is incremented by 1 in S204 because the detected expression is matched with the correct expression. As a result, the count value Cnt(2) is updated from 1 to 2.

The processing associated with the period of the third phrase will be described below.

In the first time, the "sad expression" is detected as the singer's expression in S202 of FIG. 5. The count value Cnt(3) is incremented by 1 in S204 because the detected expression is matched with the correct expression. As a result, the count value Cnt(3) is updated from 0 to 1.

In the second time, the "sad expression" is also detected as the singer's expression in S202 of FIG. 5. The count value Cnt(3) is incremented by 1 in S204 because the detected expression is matched with the correct expression. As a result, the count value Cnt(3) is updated from 1 to 2.

In the third time, the "earnest expression" is detected as the singer's expression in S202 of FIG. 5. Because the detected expression is not matched with the correct expression, the processing in S204 is not performed, but the count value Cnt(3) is maintained at 2.

In the example of FIG. 6, the count value Cnt(1) of 3 is obtained as the final value of the first frame. The detected expression is detected four times in total during the period of the first frame. Therefore, 75 points (=75%=100×3÷4) are obtained as the partial score of the first frame.

In the example of FIG. 6, the count value Cnt(2) of 2 is obtained as the final value of the second frame. The detected expression is detected four times in total during the period of the second frame. Therefore, 50 points (=50%=100×2÷4) are obtained as the partial score of the second frame.

In the example of FIG. 6, the count value Cnt(3) of 2 is obtained as the final value of the third frame. The detected expression is detected three times in total during the period of the third frame. Therefore, 67 points (=67%=100×2÷3) are obtained as the partial score of the third frame.

Therefore, 64 points (=(75+50+67)÷3) are obtained as the whole score.

As described above, in the second embodiment, the score is calculated using the target feature that is previously defined in each period of the music. The score (partial score) of each phrase and the score (whole score) of the whole music are calculated. Therefore, the singer can contrive a singing way, and enjoy the singing action.

Third Embodiment

A scoring device and a scoring method according to a third embodiment of the present invention will be described below.

Configurations of the karaoke system of the third embodiment and the scoring device of the third embodiment are similar to those of the first embodiment (FIGS. 1 and 2), the descriptions of the karaoke system and scoring device of the third embodiment are omitted.

An example in which one correct expression is previously defined with respect to the music similarly to the first embodiment will be described in the third embodiment.

Similarly to the second embodiment, the correct expression may be previously defined in each period of the music.

In the third embodiment, the feature detector 202 calculates a similarity between the expression and the singer's expression with respect to each of the plural previously-defined features. That is, in the third embodiment, the similarity between each previously-defined expression and the singer's expression is detected as the facial feature.

In the third embodiment, the score calculator 204 calculates the score based on the similarity corresponding to the correct expression.

Therefore, the score more suitable for the intention of the music provider can be obtained.

(Operation of Scoring Device)

Figure 7:
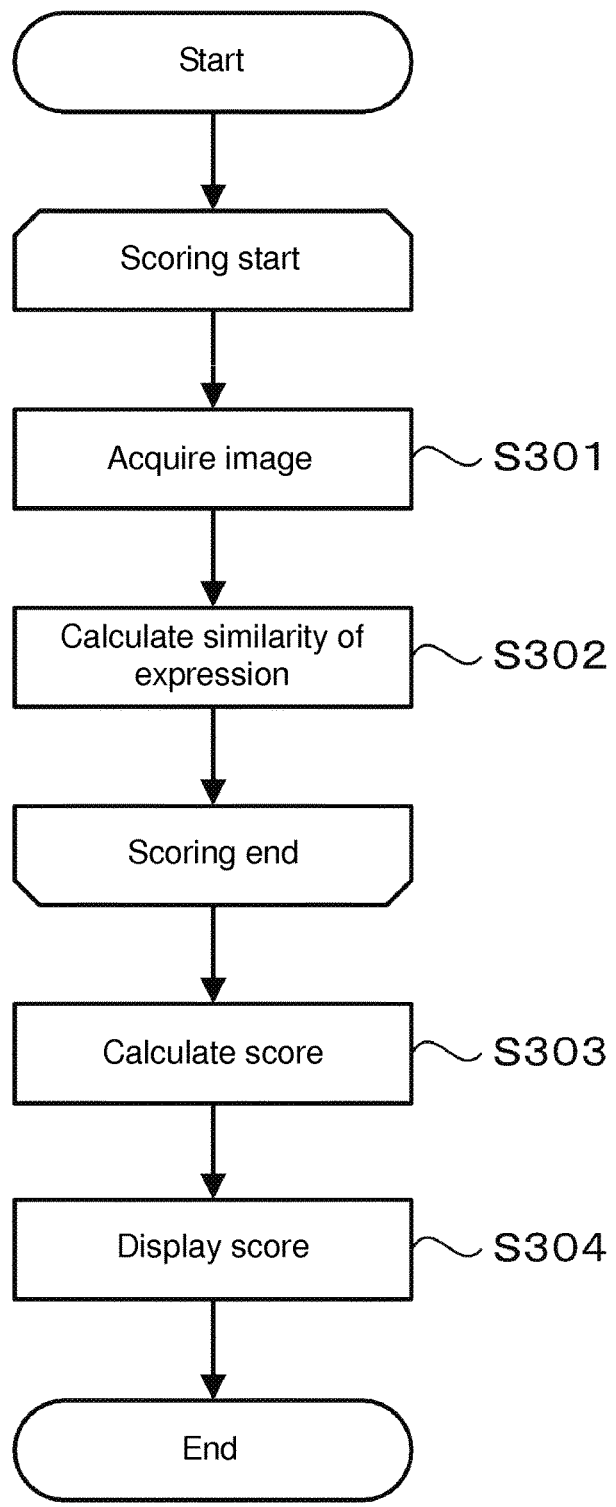
FIG. 7 is a flowchart illustrating an example of the flow of the operation of the scoring device according to the third embodiment.

An example of the flow of the operation of the scoring device 100 of the third embodiment will be described with reference to FIG. 7. A flowchart in FIG. 7 is started with the start of the music sung by the singer as the trigger. Specifically, the flowchart in FIG. 7 is started with the playback of the music to be sung by the singer as the trigger.

As illustrated in FIG. 7, pieces of processing in S301 to S302 are performed in each N frames (each predetermined time) in the period (scoring period) from the scoring start to the scoring end.

In S301, the image acquisition unit 201 acquires the photographed image data. Then the processing goes to S302.

In S302, in each previously-defined expression, the feature detector 202 calculates the similarity between the expression and the singer's expression expressed by the photographed image data acquired in S301. In the third embodiment, the similarity is calculated with respect to each of the "pleasant expression", the "sad expression", and the "earnest expression".

An expression except for the "pleasant expression", the "sad expression", and the "earnest expression" may previously be defined.

The processing goes to S303 after the scoring period is ended.

In S303, the score calculator 204 calculates the score based on the similarity (correct similarity) corresponding to the correct expression in the similarities calculated in S302. In the third embodiment, a value ranging from 0 to 100 is calculated as the similarity. The mean of the correct similarities of each N frames is calculated as the score (whole score). The score calculator 205 outputs the score data expressing the calculated score to the karaoke device 102.

The score calculating method is not limited to the above method. For example, another representative value (such as the maximum value, the minimum value, the mode, and the intermediate value) of the correct similarity of each N frames may be calculated as the score.

The third embodiment and the second embodiment may be combined with each other. Specifically, in each phrase, the partial score of the phrase may be calculated based on the correct similarity that is calculated with respect to the phrase.

The karaoke device 102 outputs the score image data expressing the score calculated in S303 to the display device 103 (S304). Therefore, the score image expressing the score calculated in S303 is displayed on the screen of the display device 103.

Similarly to the processing in S106 in FIG. 3, the processing in S304 may be performed by the scoring device 100.

(Specific example of Operation of Scoring Device)

A specific example of the operation of the scoring device 100 of the third embodiment will be described with reference to FIG. 8.

Figure 8:
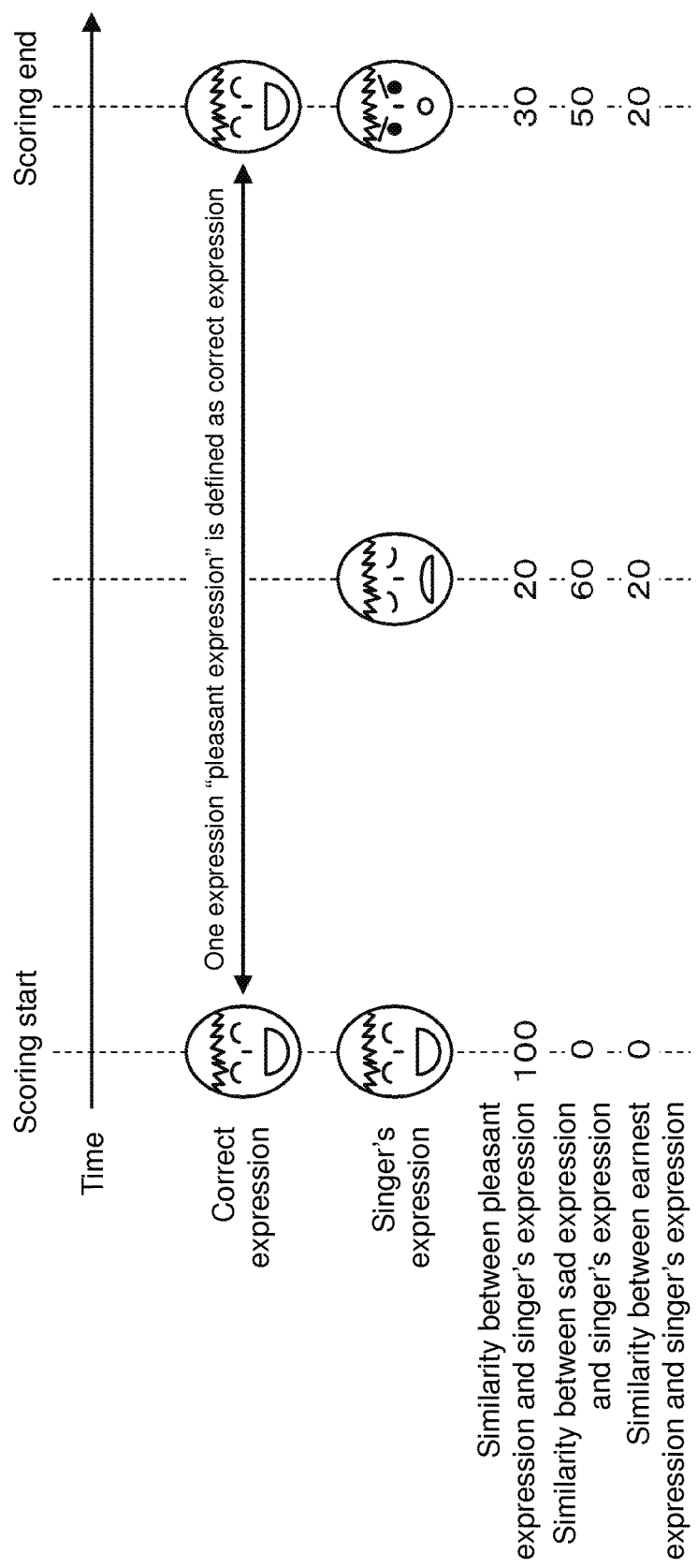
FIG. 8 is a view illustrating a specific example of the operation of the scoring device according to the third embodiment.

In the example in FIG. 8, one correct expression "pleasant expression" is previously defined with respect to the music. In the example of FIG. 8, the similarity of the expression is detected three times in total.

In the first time, in S302 of FIG. 7, the similarity between the "pleasant expression" and the singer's expression is calculated as 100, the similarity between the "sad expression" and the singer's expression is calculated as 0, the similarity between the "earnest expression" and the singer's expression is calculated as 0.

In the second time, in S302 of FIG. 7, the similarity between the "pleasant expression" and the singer's expression is calculated as 20, the similarity between the "sad expression" and the singer's expression is calculated as 60, the similarity between the "earnest expression" and the singer's expression is calculated as 20.

In the third time, in S302 of FIG. 7, the similarity between the "pleasant expression" and the singer's expression is calculated as 30, the similarity between the "sad expression" and the singer's expression is calculated as 50, the similarity between the "earnest expression" and the singer's expression is calculated as 20.

In the example of FIG. 7, the correct expression is the "pleasant expression", and the similarity between the "pleasant expression" and the singer's expression is the correct similarity described above. The similarity of the expression is calculated three times in total. Therefore, 50 points (=(100+20+30)÷3) are obtained as the score.

As described above, in the third embodiment, the singer's facial feature that is not considered in the past is considered as one of calculation criteria of the score for the singer's singing action. Therefore, the singer can contrive a singing way, and enjoy the singing action.

Fourth Embodiment

A scoring device and a scoring method according to a fourth embodiment of the present invention will be described below.

Configurations of the karaoke system of the fourth embodiment and the scoring device of the fourth embodiment are similar to those of the first embodiment (FIGS. 1 and 2), the descriptions of the karaoke system and scoring device of the fourth embodiment are omitted.

In the fourth embodiment, a feature vector extracted from the image data (the facial image data expressing the facial image) is used as the facial feature. Any piece of data may be used as the feature vector. For example, the data necessary for the detection of the expression can be used as the feature vector.

The feature vector is a set of plural feature amounts extracted from the facial image data. That is, the feature vector has each of the plural feature amounts extracted from the facial image data as a component. The number of feature amounts can arbitrarily be set according to expected score calculation accuracy, and desirably a set of feature amounts from tens to tens of thousands or more is used as the feature vector. Any kind of feature amount may be used. Examples of the feature amount include the degree of motion of the facial organ, the positional relationship between feature points of the facial organ, the visual line direction, the degree of opening of the eye, the gray value near the feature point, the periodicity of the gray value near the feature point, the directionality of the gray value near the feature point, the color distribution, and the luminance distribution. It is said that the feature vector is formed by quantifying the facial feature. As the facial feature changes by the expression or the facial motion, the feature vector also changes by the expression or the facial motion.

In the fourth embodiment, the feature vector that changes according to a time position of the music is previously defined as the target (correct) facial feature. An example in which the target facial feature vector is previously defined in each period of the music will be described below.

Similarly to the first embodiment, only one (one kind of) target feature may previously be defined with respect to the music.

In the fourth embodiment, the feature detector 202 extracts (detects) the facial feature vector of the singer from the photographed image data output from the image acquisition unit 201. Specifically, the feature detector 202 detects a singer's facial region (facial region) from the image region expressed by the photographed image data through the face detecting processing of the first embodiment. The feature detector 202 extracts the plural feature amounts from the detected facial region, and acquires the set of extracted plural feature amounts as the feature vector.

In the fourth embodiment, the score calculator 204 calculates the similarity between the feature vector extracted by the feature detector 202 and the target feature vector, and calculates the score based on the calculated similarity. Any indicator may be used as the similarity. Examples of the similarity include a distance (such as a Euclidean distance) between the two feature vectors on a feature space and an inner product of the two feature vectors. Plural axes corresponding to plural feature amounts constituting the feature vector are defined in the feature space.

Therefore, the score more suitable for the intention of the music provider can be obtained.

(Operation of Scoring Device)

Figure 9:
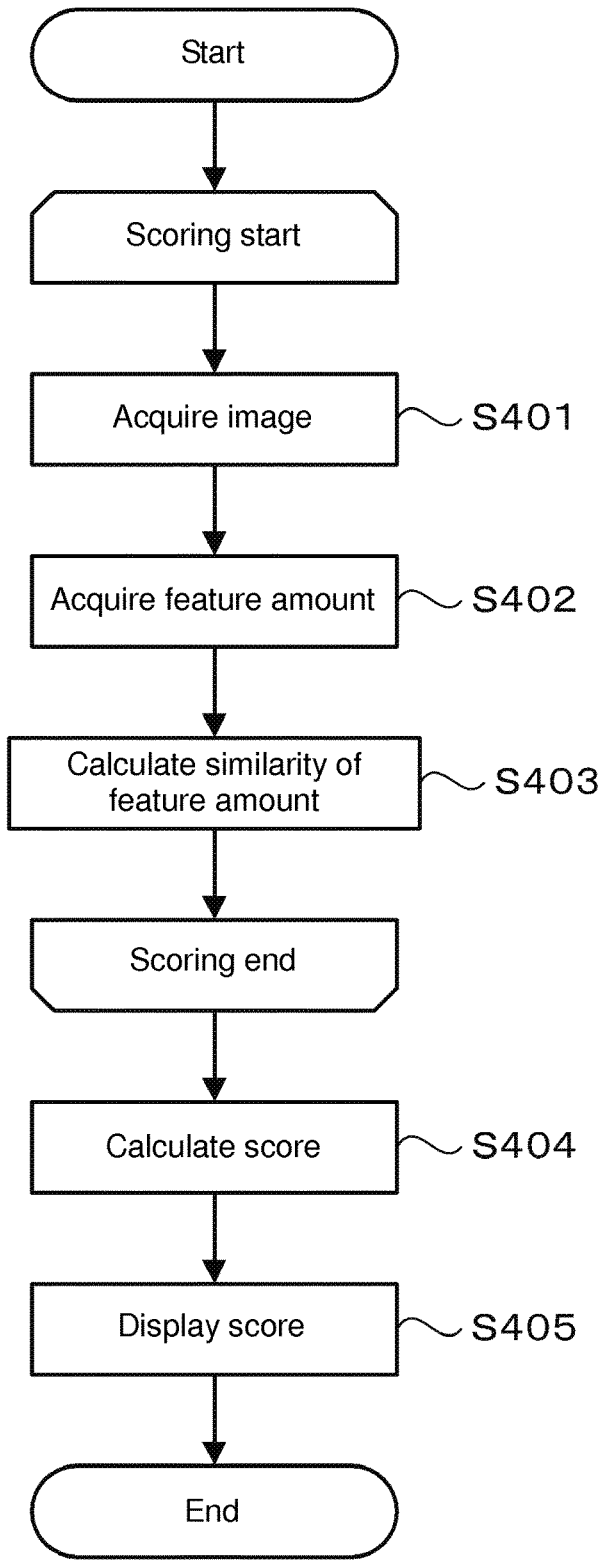
FIG. 9 is a flowchart illustrating an example of the flow of the operation of the scoring device according to the fourth embodiment.

An example of the flow of the operation of the scoring device 100 of the fourth embodiment will be described with reference to FIG. 9. A flowchart in FIG. 9 is started with the start of the music sung by the singer as the trigger. Specifically, the flowchart in FIG. 9 is started with the playback of the music to be sung by the singer as the trigger.

As illustrated in FIG. 9, pieces of processing in S401 to S403 are performed in each N frames (each predetermined time) in the period (scoring period) from the scoring start to the scoring end.

In S401, the image acquisition unit 201 acquires the photographed image data. Then the processing goes to S402.

In S402, the feature detector 202 extracts the facial feature vector of the singer from the photographed image data acquired in S401. Then the processing goes to S403.

In S403, the score calculator 204 calculates the similarity between the feature vector (detected feature vector) extracted in S402 and the feature vector (correct (target) facial feature vector; correct feature vector) recorded in the storage 203. Specifically, the similarity between the correct feature vector and the detected feature vector at the time position (the time position of the music) of the present singing target is calculated.

The processing goes to S404 after the scoring period is ended.

In S404, the score calculator 204 calculates the score based on the similarity calculated in S404. In the fourth embodiment, a value ranging from 0 to 100 is calculated as the similarity. The mean of the similarities of each N frames is calculated as the score (whole score). The score calculator 205 outputs the score data expressing the calculated score to the karaoke device 102.

The score calculating method is not limited to the above method. For example, another representative value (such as the maximum value, the minimum value, the mode, and the intermediate value) of the similarity of each N frames may be calculated as the score.

The fourth embodiment and the second embodiment may be combined with each other. Specifically, in each phrase, the partial score of the phrase may be calculated based on the similarity that is calculated with respect to the phrase.

The karaoke device 102 outputs the score image data expressing the score calculated in S303 to the display device 103 (S304). Therefore, the score image expressing the score calculated in S303 is displayed on the screen of the display device 103.

Similarly to the processing in S106 in FIG. 3, the processing in S304 may be performed by the scoring device 100.

(Specific Example of Operation of Scoring Device)

A specific example of the operation of the scoring device 100 of the fourth embodiment will be described with reference to FIG. 10.

Figure 10:
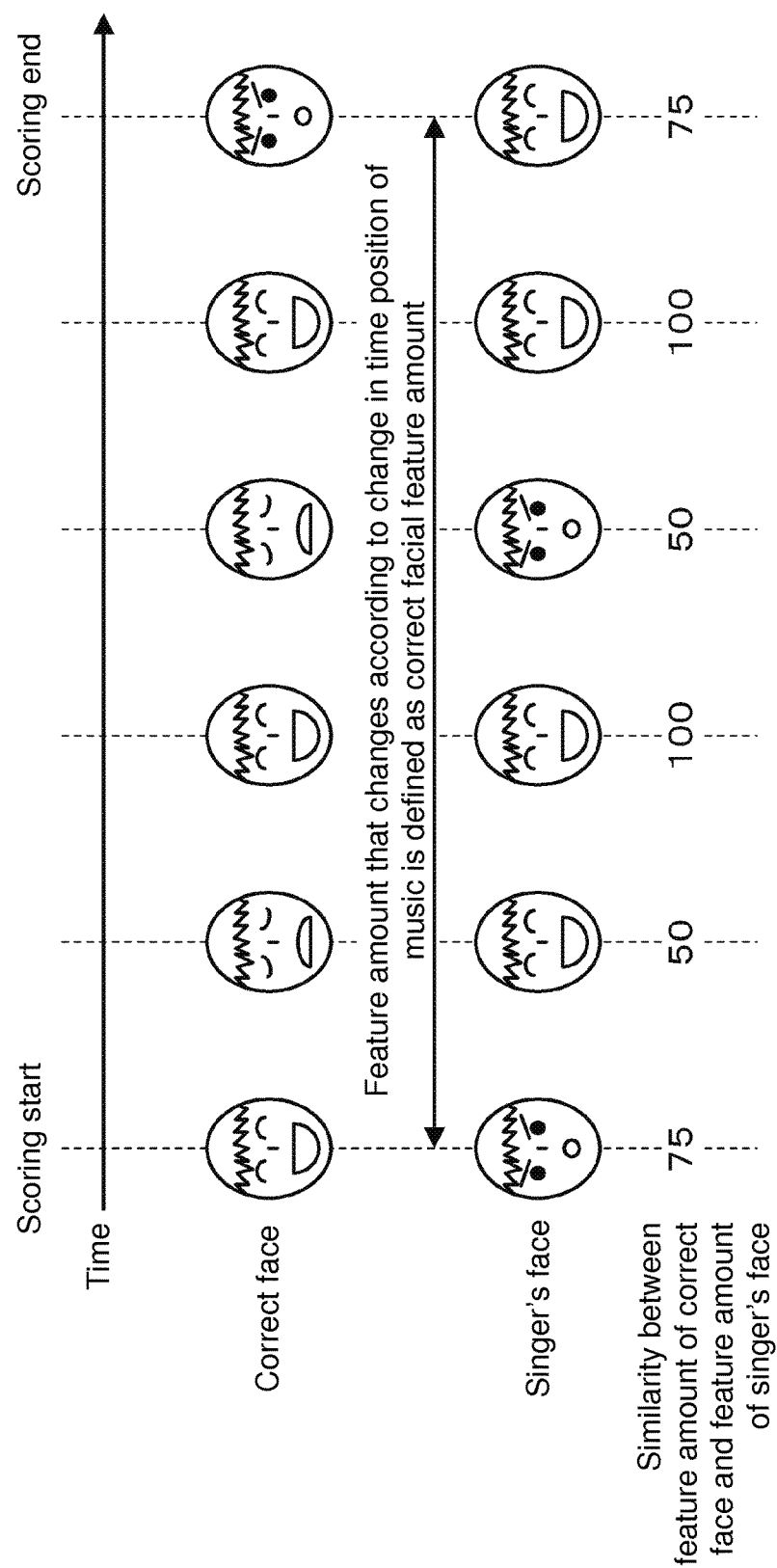
FIG. 10 is a view illustrating a specific example of the operation of the scoring device according to the fourth embodiment.

In the example of FIG. 10, the feature vector that changes according to the time position of the music is previously defined as the correct feature vector. In the example of FIG. 10, the similarity of the feature vector is detected six times in total.

In the first time, the similarity between the facial feature vector of the singer and the correct feature vector is calculated as 50 in S403 of FIG. 9.

In the second time, the similarity between the facial feature vector of the singer and the correct feature vector is calculated as 75 in S403 of FIG. 9.

In the third time, the similarity between the facial feature vector of the singer and the correct feature vector is calculated as 100 in S403 of FIG. 9.

In the fourth time, the similarity between the facial feature vector of the singer and the correct feature vector is calculated as 50 in S403 of FIG. 9.

In the fifth time, the similarity between the facial feature vector of the singer and the correct feature vector is calculated as 100 in S403 of FIG. 9.

In the sixth time, the similarity between the facial feature vector of the singer and the correct feature vector is calculated as 75 in S403 of FIG. 9.

In the example of FIG. 10, the similarity of the feature vector is calculated six times in total. Therefore, 75 points (=(50+75+100+50+100+75)÷6) are obtained as the score.

As described above, in the fourth embodiment, the singer's facial feature that is not considered in the past is considered as one of calculation criteria of the score for the singer's singing action. Therefore, the singer can contrive a singing way, and enjoy the singing action.

In the fourth embodiment, various pieces of score calculating processing can be performed by changing the correct expression vector generating method. For example, the score calculating processing, in which the high score is obtained when the singer performs the singing with the face similar to the artist's face of the music, can be performed using the feature vector extracted from the facial image data of the artist of the music as the correct expression vector. The score calculating processing in which the score substantially equal to that of the first to third embodiments is obtained can be performed using the feature vector extracted from the facial image data expressing a general facial image of the target expression as the correct expression vector.

Fifth Embodiment

A scoring device and a scoring method according to a fifth embodiment of the present invention will be described below.

Configurations of the karaoke system of the fifth embodiment and the scoring device of the fifth embodiment are similar to those of the first embodiment (FIGS. 1 and 2), the descriptions of the karaoke system and scoring device of the fifth embodiment are omitted.

In the fifth embodiment, a feature change position that is of the time position, where the singer performs the singing while changing the facial feature, is previously defined with respect to the music sung by the singer. Specifically, information expressing the feature change position is previously recorded in the storage 203.

In the fifth embodiment, the score calculator 204 calculates the score based on a degree of change in detected feature (the feature detected by the feature detector 202) at the feature change position.

Therefore, the score more suitable for the intention of the music provider can be obtained.

There is no particular limitation to the facial feature used in the fifth embodiment. In the fifth embodiment, for example, a degree of motion of the facial organ can be used as the facial feature. For example, the degree of motion of the facial organ can be detected based on a position change of the feature point as illustrated in FIG. 13. Specifically, a degree of change (fluctuation) in distance between the feature point 301 and feature point 302 in FIG. 13 can be detected as a degree of motion of the mouth.

(Operation of Scoring Device)

Figure 11:
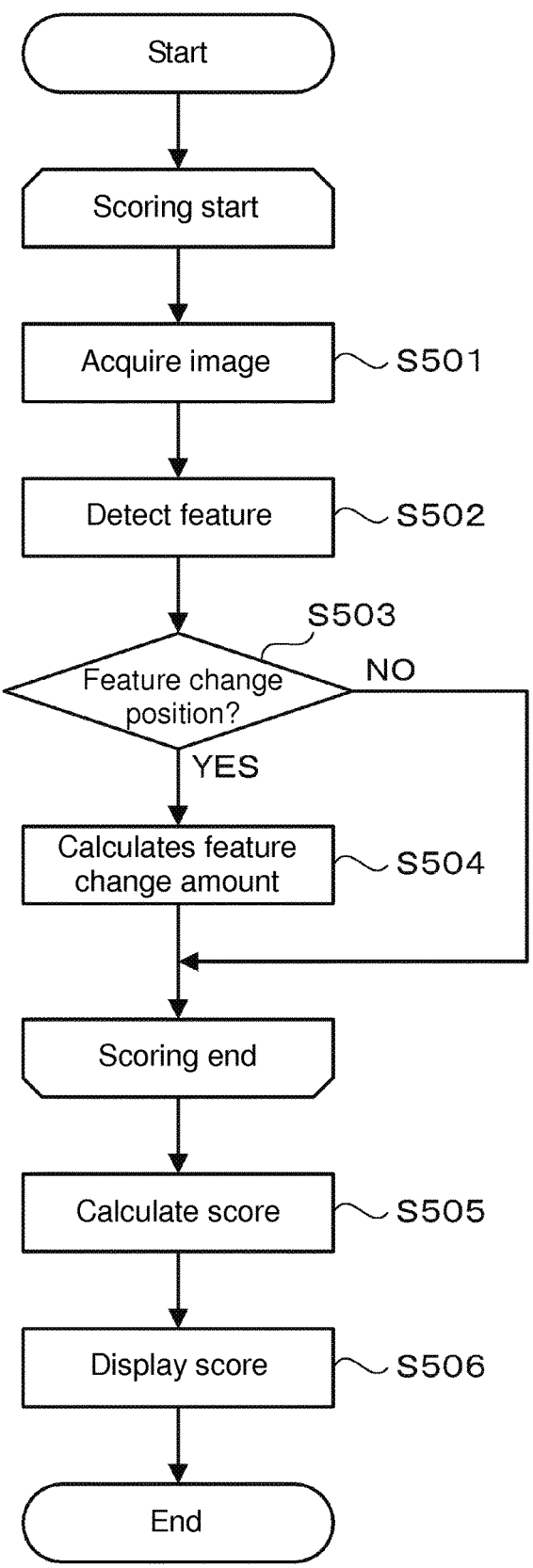
FIG. 11 is a flowchart illustrating an example of the flow of the operation of the scoring device according to the fifth embodiment.

An example of the flow of the operation of the scoring device 100 of the fifth embodiment will be described with reference to FIG. 11. A flowchart in FIG. 11 is started with the start of the music sung by the singer as the trigger. Specifically, the flowchart in FIG. 11 is started with the playback of the music to be sung by the singer as the trigger.

As illustrated in FIG. 11, pieces of processing in S501 to S504 are performed in each N frames (each predetermined time) in the period (scoring period) from the scoring start to the scoring end.

In S501, the image acquisition unit 201 acquires the photographed image data. Then the processing goes to S502.

In S502, the feature detector 202 detects the singer's facial feature from the photographed image data acquired in S501. Then the processing goes to S503.

In S503, the feature detector 202 determines whether the time position (the time position of the music) of the present singing target is the feature change position. The processing goes to S504 when the time position of the present singing target is the feature change position. The processing in S504 is not performed when the time position of the present singing target is not the feature change position.

In S504, the feature detector 202 calculates the degree of change in facial feature (feature change amount) based on the feature (present feature) detected in S502 and the feature (past feature) detected in the past. For example, the past feature is the preceding feature of the present feature, and a difference (absolute value) between the past feature and the present feature is calculated as the feature change amount.

The past feature is not limited to the preceding feature of the present feature. Any feature that is detected earlier than the present feature may be used as the past feature. Plural past features are used, and a representative value of the difference (absolute value) between the past feature and the present feature may be calculated as the feature change amount.

The pieces of processing in S503 and S504 may be performed by the score calculator 204.

The processing goes to S505 after the scoring period is ended.

In S505, the score calculator 204 calculates the score based on the feature change amount calculated in S504. In the fifth embodiment, a value that is normalized using a value ranging from 0 to 100 is calculated as the feature change amount. The mean of the calculated plural feature change amounts is calculated as the score (whole score). In the case that the number of feature change positions is 1, the feature change amount calculated in S504 is calculated (set) as the score (whole score).

The score calculating method is not limited to the above method. For example, another representative value (such as the maximum value, the minimum value, the mode, and the intermediate value) of the plural feature change amounts may be calculated as the score.

The fifth embodiment and the second embodiment may be combined with each other. Specifically, in each phrase, the partial score of the phrase may be calculated based on the feature change amount that is calculated with respect to the phrase.

The karaoke device 102 outputs the score image data expressing the score calculated in S505 to the display device 103 (S506). Therefore, the score image expressing the score calculated in S505 is displayed on the screen of the display device 103.

Similarly to the processing in S106 in FIG. 3, the processing in S506 may be performed by the scoring device 100.

(Specific Example of Operation of Scoring Device)

A specific example of the operation of the scoring device 100 of the fifth embodiment will be described with reference to FIG. 12.

Figure 12:
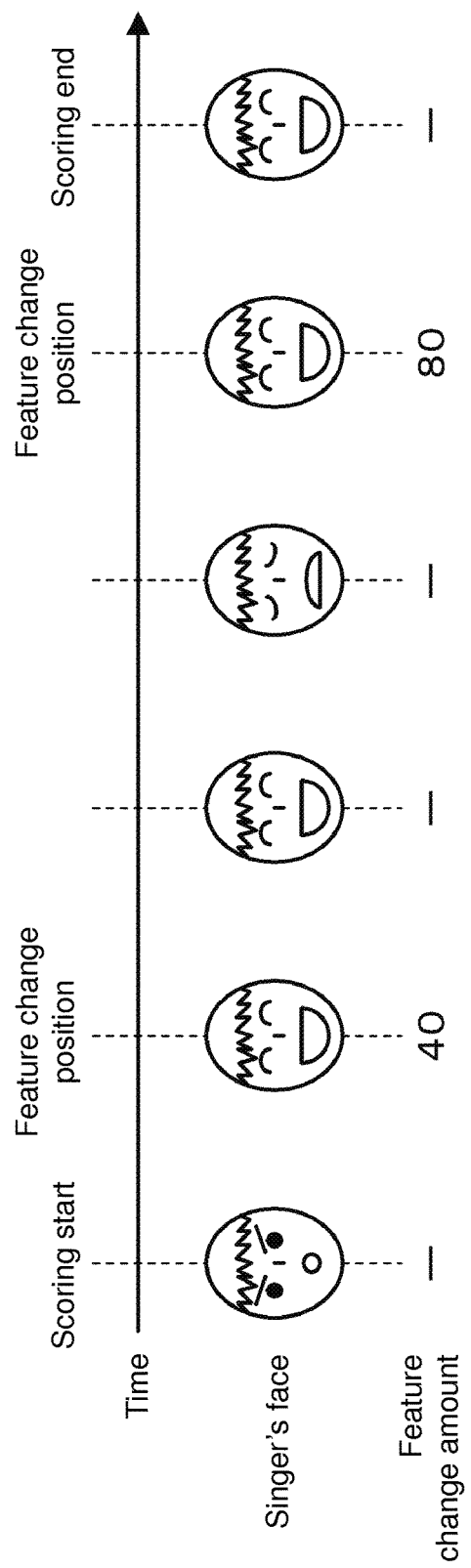
FIG. 12 is a view illustrating a specific example of the operation of the scoring device according to the fifth embodiment.

In the example of FIG. 12, two feature change positions are previously defined in the scoring period of the music. In the example of FIG. 12, the singer's facial feature is detected six times in total.

In the first time, the processing in S504 of FIG. 11 is not performed because the time position of the singing target is not the feature change position. That is, the feature change amount is not calculated in the first time. In FIG. 12, a mark "—" indicates that the feature change amount is not calculated.

In the second time, the feature change amount is calculated in S504 of FIG. 11 because the time position of the singing target is the feature change position. In the example of FIG. 12, the singer's expression changes from the earnest expression to the pleasant expression, and the feature change amount is calculated as 40.

In the third and fourth times, the processing in S504 of FIG. 11 is not performed because the time position of the singing target is not the feature change position.

In the fifth time, the feature change amount is calculated in S504 of FIG. 11 because the time position of the singing target is the feature change position. In the example of FIG. 12, the singer's expression changes from the sad expression to the pleasant expression, and the feature change amount is calculated as 80.

In the sixth time, the processing in S504 of FIG. 11 is not performed because the time position of the singing target is not the feature change position.

In the example of FIG. 12, the total number of feature change positions is 2. Therefore, 60 points (=(40+80)÷2) are obtained as the score.

As described above, in the fifth embodiment, the singer's facial feature that is not considered in the past is considered as one of calculation criteria of the score for the singer's singing action. Therefore, the singer can contrive a singing way, and enjoy the singing action.

Other Embodiments

In one or more of the above embodiments, by way of example, the score output from the scoring device 100 is converted into the score image by the karaoke device 102, and the score image is displayed on the display device 103. However, a use form of the score is not limited to the above embodiments. For example, the karaoke device 102 may convert the output score into a message that is previously defined while associated with the score ("good!" and "try a little bit more"), and output the message to the display device 103, or the karaoke device 102 may convert the output score into the motion or expression of a character drawn on the screen of the display device 103, and output the motion or expression of the character to the display device 103. An output destination is not limited to the display device 103. Alternatively, the score may be converted into some kind of sound, and output as the sound from the speaker 104, or the score may be exhibited as a change in lighting of a room in which the karaoke device 102 is installed.

One or more embodiments of the present invention can be performed with a computer of a system or device (or devices such as a CPU and an MPU) that implements the function of one or more embodiments of the present invention by reading and executing a program recorded in a storage device. For example, one or more embodiments of the present invention can be performed by a method including steps performed by the computer of the system or device that implements the function of one or more embodiments of the present invention by reading and executing a program recorded in a storage device. To this end, for example, the program is provided to the computer through a network or from various types of recording mediums (that is, computer-readable recording mediums in which data is non-transiently stored) constituting the recording device. Accordingly, the computer (including devices such as the CPU and the MPU), the method, the program (including a program code and a program product), and a computer-readable recording medium in which the program is non-transiently stored are also included in the scope of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A scoring device comprising:
an acquisition unit that acquires image data in which a singer is photographed;
a detector that detects a feature associated with an expression or a facial motion during singing as a facial feature of the singer from the image data acquired by the acquisition unit;
a calculator that calculates a score for singing action of the singer based on the feature detected by die detector; and
an output unit that outputs the score,
wherein a target expression is previously defined with respect to music being sung by the singer as a target feature,
wherein the detector detects the facial feature of the singer in a scoring period that is of at least part of a period of the music being sung, and
wherein the calculator calculates the score as a sum of lengths of periods in which the facial feature matched with the target feature detected in the scoring period.

2. The scoring device according to claim 1,
wherein the image data is image data of a moving image,
wherein the detector detects the facial feature of the singer in each N frame of the moving image, wherein N is an integer of 1 or more, and
wherein the calculator calculates the score based on the feature of each N frame.

3. The scoring device according to claim 1,
wherein the calculator compares the feature detected by the detector to the target feature, and calculates the score based on a result of the comparison.

4. The scoring device according to claim 3,
wherein the target feature is a feature vector extracted from the image data,
wherein the detector extracts the facial feature vector of the singer from the image data acquired by the acquisition unit, and
wherein the calculator calculates a similarity between the feature vector extracted by the detector and the target feature vector, and calculates the score based on the calculated similarity.

5. The scoring device according to claim 1,
wherein the detector calculates a similarity between the previously-defined expression and the expression of the singer with respect to each of a plurality of expressions, and
wherein the calculator calculates the score based on the similarity corresponding to the target expression.

6. The scoring device according to claim 3, wherein the target feature is previously defined in each phase of the music sung by the singer.

7. The scoring device according to claim 1,
wherein a feature change position that is of a time position where the singer should perform the singing while changing the facial feature is previously defined with respect to the music sung by the singer, and
wherein the calculator calculates the score based on a degree of change in the feature detected by the detector in the feature change position.

8. The scoring device according to claim 1, wherein, in each phrase of the music sung by the singer, the calculator calculates a partial score that is of the score for singing action of the phrase sung by the singer based on the facial feature of the singer when the singer sings the phrase.

9. The scoring device according to claim 2,
wherein the calculator compares the feature detected by the detector to the target feature, and calculates the score based on a result of the comparison.

10. The scoring device according to claim 2,
wherein the detector calculates a similarity between the previously-defined expression and the expression of the singer with respect to each of a plurality of expressions, and
wherein the calculator calculates the score based on the similarity corresponding to the target expression.

11. The scoring device according to claim 1, wherein the target feature is previously defined in each phase of the music sung by the singer.

12. The scoring device according to claim 4, wherein the target feature is previously defined in each phase of the music sung by the singer.

13. The scoring device according to claim 5, wherein the target feature is previously defined in each phase of the music sung by the singer.

14. A scoring method comprising:
acquiring image data in which a singer is photographed;
detecting a facial feature of the singer from the image data that is acquired;
calculating a score for singing action of the singer based on the feature that is detected; and
outputting the score,
wherein a target expression is previously defined with respect to music being sung by the singer as a target feature,
wherein the facial feature of the singer is detected in a scoring period that is of at least part of a period of the music being sung, and
wherein the score is calculated as a sum of lengths of periods in which the facial feature matched with the target feature detected in the scoring period.

15. A program stored on a non-transitory computer-readable medium that causes a computer to perform a scoring method comprising:
acquiring image data in which a singer is photographed;
detecting a facial feature of the singer from the image data acquired;
calculating a score for singing action of the singer based on the feature detected; and
outputting the score,
wherein a target expression is previously defined with respect to music being sung by the singer as a target feature,
wherein the facial feature of the singer is detected in a scoring period that is of at least part of a period of the music being sung, and
wherein the score is calculated as a sum of lengths of periods in which the facial feature matched with the target feature detected in the scoring period.

\* \* \* \* \*